(12) United States Patent
Kurita et al.

(10) Patent No.: US 7,596,796 B2
(45) Date of Patent: Sep. 29, 2009

(54) DISK CARTRIDGE, AND DISK RECORDING AND/OR REPRODUCING DEVICE

(75) Inventors: Kazuhito Kurita, Kanagawa (JP); Tokio Kanada, Kanagawa (JP); Takahiro Yamada, Saitama (JP)

(73) Assignee: Sony Corporation, Tokyo (JP)

( * ) Notice: Subject to any disclaimer, the term of this patent is extended or adjusted under 35 U.S.C. 154(b) by 358 days.

(21) Appl. No.: 10/565,778

(22) PCT Filed: Jul. 23, 2004

(86) PCT No.: PCT/JP2004/010513

§ 371 (c)(1),
(2), (4) Date: Jan. 25, 2006

(87) PCT Pub. No.: WO2005/010883

PCT Pub. Date: Feb. 3, 2006

(65) Prior Publication Data

US 2006/0184954 A1    Aug. 17, 2006

(30) Foreign Application Priority Data

| Jul. 28, 2003 | (JP) | ............................. 2003-281390 |
| Jul. 28, 2003 | (JP) | ............................. 2003-281393 |
| May 10, 2004 | (JP) | ............................. 2004-140490 |

(51) Int. Cl.
*G11B 17/04* (2006.01)
*G11B 23/03* (2006.01)

(52) U.S. Cl. ...................................... 720/703; 720/728

(58) Field of Classification Search ......... 720/728–744, 720/703, 704, 695

See application file for complete search history.

(56) References Cited

U.S. PATENT DOCUMENTS 5,416,762 A * 5/1995 Ohmori et al. ............... 720/715

(Continued)

FOREIGN PATENT DOCUMENTS

JP  3-283066  12/1991

(Continued)

OTHER PUBLICATIONS

U.S. Appl. No. 10/550,562, filed Sep. 26, 2005, Kurita et al.

(Continued)

*Primary Examiner*—William J Klimowicz
(74) *Attorney, Agent, or Firm*—Oblon, Spivak, McClelland, Maier & Neustadt, L.L.P.

(57) ABSTRACT

A disc cartridge having rotatably housed an optical disc (2) is disclosed. The disc cartridge includes a main cartridge body unit (5) having an aperture for the head part (13) for exposing a portion of the optical disc to outside across the inner and outer rims of the disc. In one surface of the main cartridge body unit is formed a center opening (12) into which is intruded a turntable (90) for rotationally driving the optical disc. An inner peripheral surface (81) of the center opening operates as a mounting reference plane along the planar direction when mounting the disc cartridge to a recording and/or reproducing apparatus. The rim of the opening of the one surface of the main cartridge body unit operates as a mounting reference surface (82) along the height-wise direction. The main cartridge body unit has an inserting end side into the recording and/or reproducing apparatus formed as a substantially semicircular arcuate section (7) having, as center, the center of the optical disc housed in the main cartridge body unit.

7 Claims, 21 Drawing Sheets

U.S. PATENT DOCUMENTS

| | | | |
|---|---|---|---|
| 5,940,357 A * | 8/1999 | Yamamiya | 720/683 |
| 6,268,977 B1 * | 7/2001 | Yamada et al. | 360/99.06 |
| 6,320,836 B1 | 11/2001 | Hattori et al. | |
| 6,339,583 B1 | 1/2002 | Watanabe et al. | |
| 2003/0103436 A1 * | 6/2003 | Nakashima | 369/77.2 |

FOREIGN PATENT DOCUMENTS

| | | |
|---|---|---|
| JP | 5-47132 | 2/1993 |
| JP | 5-135465 | 6/1993 |
| JP | 06275048 A * | 9/1994 |
| JP | 08306107 A * | 11/1996 |
| JP | 10188510 A * | 7/1998 |
| JP | 11306651 A * | 11/1999 |
| JP | 2000090539 A * | 3/2000 |
| JP | 2001076477 A * | 3/2001 |
| JP | 2001101817 A * | 4/2001 |
| JP | 2001101824 A * | 4/2001 |
| JP | 2001-357650 | 12/2001 |
| JP | 2003115152 A * | 4/2003 |
| JP | 2003123351 A * | 4/2003 |

OTHER PUBLICATIONS

U.S. Appl. No. 10/565,778, filed Jan. 25, 2006, Kurita et al.

* cited by examiner

디스크 카트리지, AND DISK RECORDING
DISK CARTRIDGE, AND DISK RECORDING AND/OR REPRODUCING DEVICE

BACKGROUND OF THE INVENTION

1. Field of the Invention

This invention relates to a disc cartridge, having a disc-shaped recording medium, such as an optical disc, housed therein, and a disc recording and/or reproducing apparatus, on which is loaded this disc cartridge.

This application claims priority based upon the Japanese Patent Applications 2003-281390 and 2003-281393, filed in Japan on Jul. 28, 2003, and the Japanese Patent Application 2004-140490, filed in Japan on May 10, 2004. These applications are incorporated in their entirety by reference herein.

2. Description of Related Art

Up to now, a disc cartridge, having a disc-shaped recording medium, such as an optical disc, rotatably housed therein, and which is loaded on a disc recording and/or reproducing apparatus, as the disc-shaped recording medium is housed therein, has been in use extensively. This sort of the disc cartridge, comprising a disc-shaped recording medium, housed in a main cartridge body unit, can be loaded/unloaded for the disc recording and/or reproducing apparatus, with the disc-shaped recording medium being in a protected state.

Meanwhile, the size of the disc cartridge has to be reduced to as small a value as possible, in keeping with the size of the disc-shaped recording medium, housed therein, in order to reduce the size of the disc recording and/or reproducing apparatus, employing the disc cartridge, in order to provide for facilitated handling of the disc cartridge, and in order to save the cartridge material and hence the production cost.

A disc cartridge, reduced in size in keeping with the size of the disc-shaped recording medium, housed therein, is disclosed in, for example, the Japanese Laid-Open Patent Publication H11-353845 (Patent Publication 1).

In this disc cartridge, disclosed in the Patent Publication 1, the lateral side thereof corresponding to the inserting end into the recording and/or reproducing apparatus, is substantially arcuate-shaped to reduce the size of the disc cartridge per se.

It is desired to reduce the disc cartridge, having housed therein the disc-shaped recording medium, further in size through realization of high recording density of the disc-shaped recording medium. Moreover, it is desired to reduce the disc cartridge further in size for further reducing the size of the disc cartridge.

Meanwhile, disc cartridges, inclusive of one described in Patent Publication 1, are loaded in position in a cartridge loading section in a recording and/or reproducing apparatus along the planar direction and along the height-wise direction. This setting of the loading position is by engaging a positioning reference pin provided on the cartridge loading section in a positioning reference hole provided to the disc cartridge.

In conventional disc cartridges, this positioning reference hole is provided in an area offset from an area in which is located the disc-shaped recording medium housed therein. The purpose for doing this is to enable the positioning reference hole to be deeper in depth, in order that, for reliable engagement between a positioning reference pin provided to the recording and/or reproducing apparatus and the positioning reference hole, a sufficient amount of relative movement will be afforded for the positioning reference pin and the positioning reference hole to be engaged with each other.

If the positioning reference hole is provided outside the area where there is housed the disc-shaped recording medium, the disc cartridge cannot be further reduced in size.

On the other hand, with the recording and/or reproducing apparatus, employing this sort of the disc cartridge, the apparatus itself cannot be reduced in size because the positioning reference pin needs to be provided on an outer side of a casting area of the disc-shaped recording medium, even though the disc drive unit for rotationally driving the disc-shaped recording medium for recording and/or reproduction is reduced in size so as to be accommodated in such casting area.

In currently widely used disc cartridges, inclusive of one described in Patent Publication 1, the recording and/or reproducing aperture for exposing a signal recording area of the disc-shaped recording medium to outside is formed within the plane of the main cartridge body unit. In this type of the disc cartridge, the signal recording area cannot be efficiently extended as far as the outer rim of the disc-shaped recording medium, because it is necessary to cause movement of the recording and/or reproducing head within the range of the recording and/or reproducing aperture formed within the plane of the main cartridge body unit in order to scan the signal recording area of the disc-shaped recording medium.

If an optical disc, in which attempts have been made to improve the recording density, is used as a recording medium, an optical pickup having an objective lens with a high numerical aperture (NA) is used as a recording and/or reproducing head, for further reducing the beam diameter of the light beam scanning the signal recording area of the optical disc. If such optical pickup is used, the optical pickup needs to be approached to the optical disc. For approaching the optical pickup to the optical disc, at least a portion of the optical pickup needs to be intruded into the disc cartridge. Should the optical pickup be partially intruded into the disc cartridge, limitations are imposed on the area of possible movement of the optical pickup, with the result that the signal recording area cannot efficiently be extended as far as the outer rim of the disc-shaped recording medium.

Since it is difficult with the conventional disc cartridge to extend the signal recording area of the disc-shaped recording medium, housed therein, it is difficult to enlarge the recording capacity as it is attempted to reduce the size of the disc-shaped recording medium.

DISCLOSURE OF THE INVENTION

It is an object of the present invention to provide a disc cartridge that can be reduced further in size in keeping with the disc housed therein.

It is another object of the present invention to provide a disc cartridge capable of reducing the size of a recording and/or reproducing apparatus employing the disc cartridge.

It is another object of the present invention to provide a disc cartridge that can be loaded in position on the recording and/or reproducing apparatus.

It is yet another object of the present invention to provide a disc recording and/or reproducing apparatus in which, as the loading position of the disc cartridge is accurately set, the apparatus itself can be reduced in size.

A disc cartridge according to the present invention comprises a disc and a main cartridge body unit adapted for rotatably housing the disc therein and provided in at least one surface thereof with a recording and/or reproducing aperture for exposing a part of the disc across inner and outer rims. An opening for a driving unit, into which is intruded at least a part of rotational driving means for rotationally driving the disc, is formed in one surface of the main cartridge body unit. The inner peripheral surface of the opening for the driving unit operates as a mounting reference plane in a planar direction for mounting the disc cartridge on a recording and/or reproducing apparatus. The peripheral edge of the opening for a driving unit in the one surface operates as a mounting reference plane in the height-wise direction for mounting the disc cartridge on the recording and/or reproducing apparatus.

A lateral side of the main cartridge body unit, forming the disc cartridge according to the present invention, is formed as a substantially semicircular arcuate section having the center of the disc housed in the main cartridge body unit as center of curvature.

The main cartridge body unit is provided with a recording and/or reproducing aperture for exposing to outside at least a portion of a signal recording area of the disc across the inner and outer rims of the disc. This recording and/or reproducing aperture is formed facing a lateral side of the main cartridge body unit other than the lateral side formed as the arcuate section.

The disc cartridge according to the present invention further comprises a shutter unit for opening/closing the recording and/or reproducing aperture, and a slide guide formed on the main cartridge body unit for movably carrying the shutter unit. The slide guide is provided such that, when the inner peripheral surface is set on the recording and/or reproducing apparatus, the mounting reference plane in the height-wise direction is protruded from the slide guide towards the rotational driving means.

When the disc cartridge according to the present invention is loaded on the recording and/or reproducing apparatus, the recording and/or reproducing head may be positioned across the inner rim and the outside of the main cartridge body unit. The result is that the head may scan up to the outermost rim area of the disc to enlarge the signal recording area and hence the recording capacity.

The present invention also provides a disc recording and/or reproducing apparatus comprising a loading support part having a fitting protrusion fitted in the driving opening of the disc cartridge, the loading support part carrying the peripheral edge of the opening of the disc cartridge, and a mounting support part for positioning the disc cartridge in the horizontal direction and in the height-wise direction.

The disc cartridge according to the present invention may have its mounting position set by the inner peripheral surface and the peripheral edge of an opening into which is intruded a turntable, as a portion of rotational driving means provided to the disc recording and/or reproducing apparatus, and may be loaded in this state on the recording and/or reproducing apparatus, so that there is no necessity of providing a positioning reference hole outside the area where the disc is housed, and hence the disc cartridge may be reduced in size further in keeping with the disc housed therein.

With the recording and/or reproducing apparatus, employing the disc cartridge according to the present invention, there is no necessity of providing means for setting the mounting position of the disc cartridge, such as positioning pins provided on the rim of the disc drive unit, and hence the apparatus itself may further be reduced in size.

Other objects and specified advantages of the present invention will become more apparent from the following explanation of the preferred embodiments which will be made with reference to the drawings.

DESCRIPTION OF THE PREFERRED EMBODIMENTS

Figure 1:
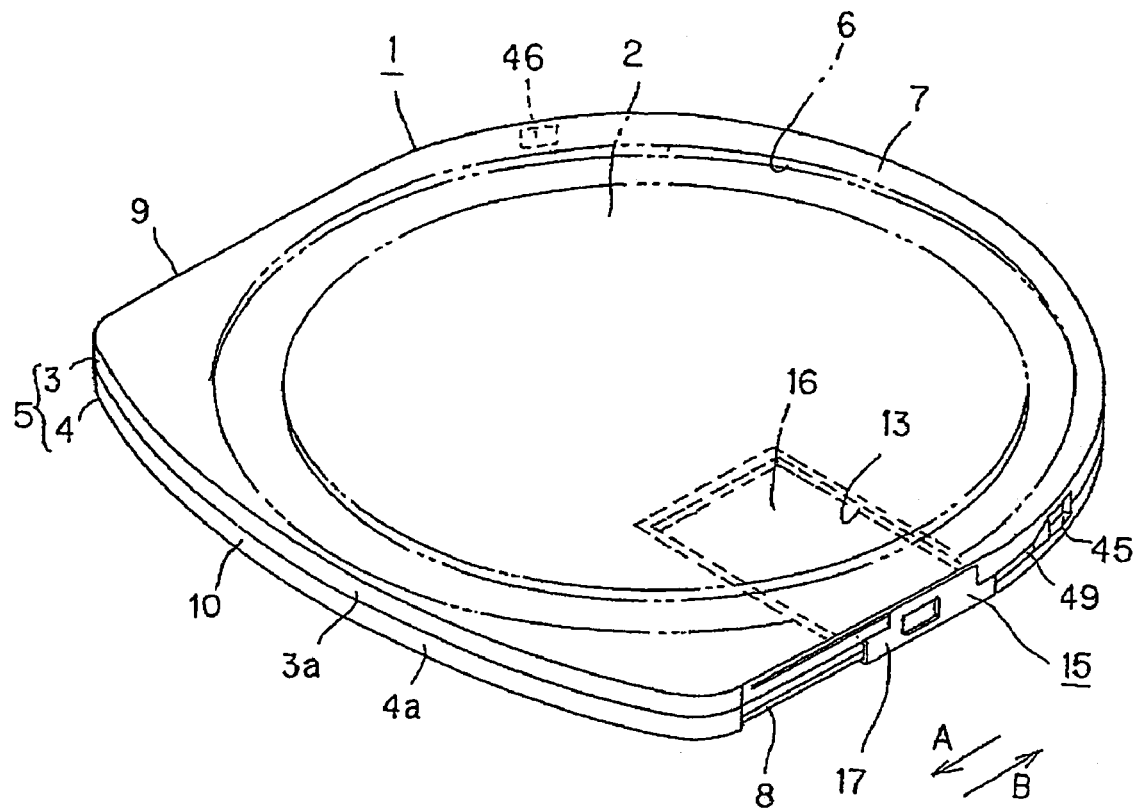
FIG. 1 is a perspective view showing a disc cartridge according to the present invention, looking from an upper cartridge half side.

Referring now to the drawings, a disc cartridge according to the present invention is explained in detail.

Figure 2:
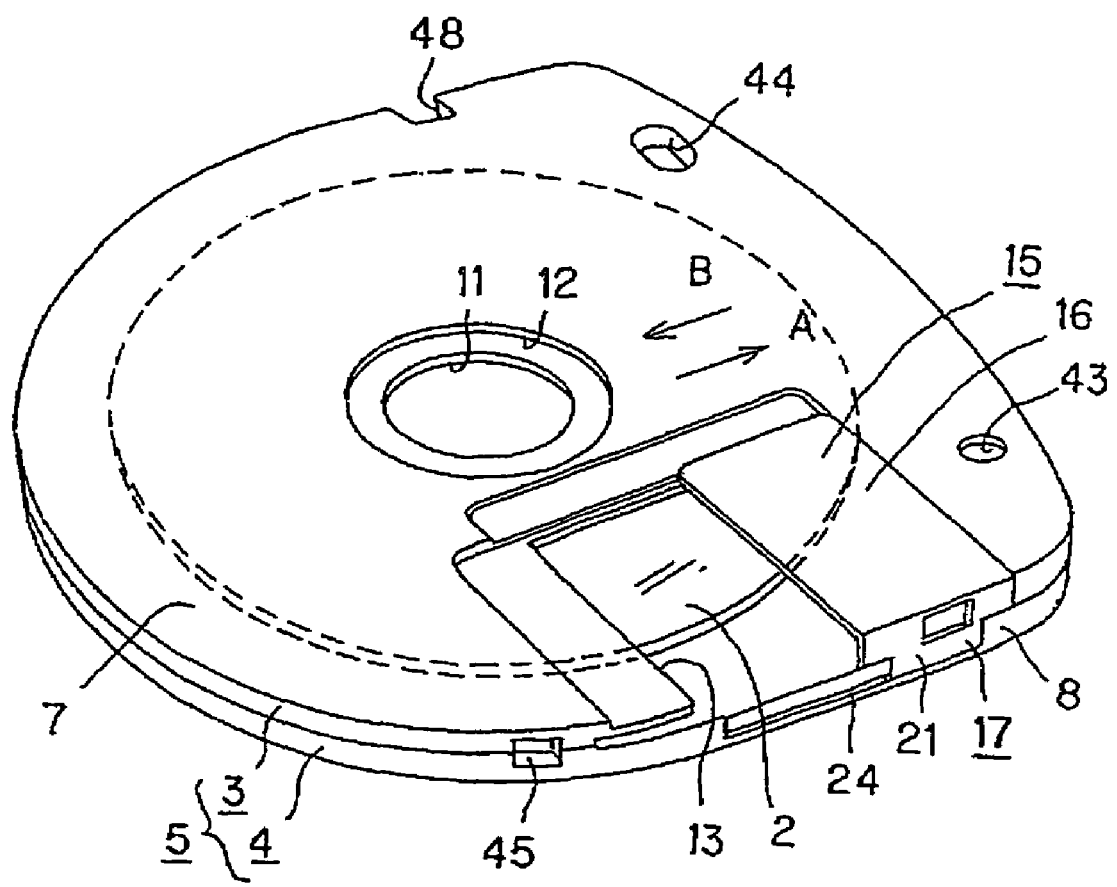
FIG. 2 is a perspective view showing a disc cartridge according to the present invention, looking from a lower cartridge half side.

A disc cartridge 1 according to the present invention houses therein an optical disc 2, as a disc-shaped recording medium, for rotation therein, and includes a main cartridge body unit 5, made up by upper and lower cartridge halves 3, 4, abutted and bonded together, as shown in FIGS. 1 and 2. The optical disc 2 is rotatably housed within this main cartridge body unit 5.

The disc cartridge 1 according to the present invention houses therein the optical disc 2, on which there are recorded program data or video data for executing e.g. a television game, and is of an extremely small size. The present disc cartridge 1 houses therein a small-sized optical disc 2 with a diameter on the order of, for example, 60 mm, and is of a size that can be held in a user's palm.

Meanwhile, the optical disc 2, housed in the present disc cartridge 1, is a replay-only disc, having information signals, such as program data, pre-recorded thereon.

The upper and lower cartridge halves 3, 4, making up a main cartridge body unit 5, housing the disc cartridge 1, is molded from a synthetic resin material, and upstanding peripheral wall sections 3a, 4a are formed on the outer rim of the cartridge halves 3, 4, respectively. The upper and lower cartridge halves 3, 4 are bonded together, with the peripheral wall sections 3a, 4a abutting to each other, thereby forming the main cartridge body unit 5 delimiting a disc housing section 6 therein. The upper and lower cartridge halves 3, 4 are bonded to each other to form the main cartridge body unit 5, by applying a welding technique, such as an ultrasonic welding technique, to welding projections formed upright on abutting surfaces of the upstanding wall sections 3a, 4a or on the inner sides of the upper and lower cartridge halves 3, 4 facing each other.

Figure 3:
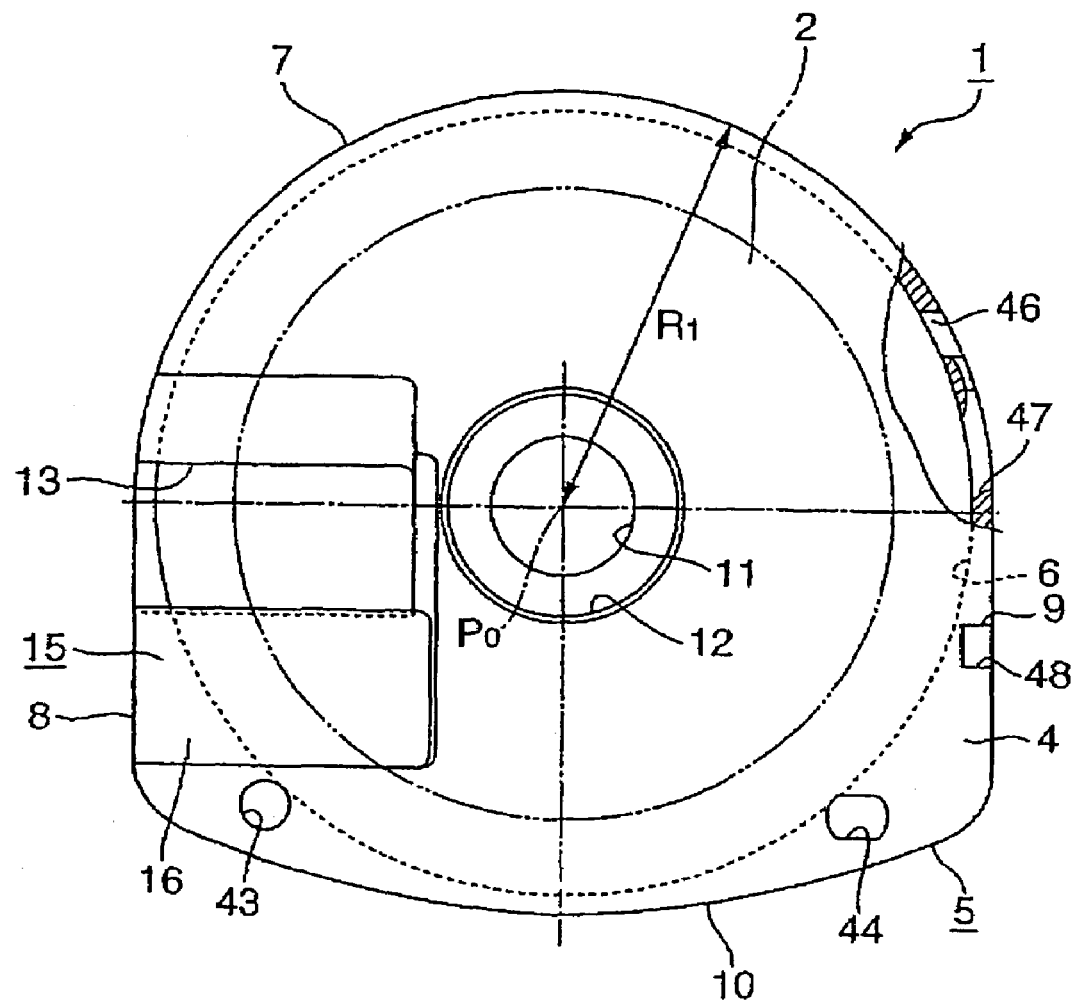
FIG. 3 is a plan view showing a disc cartridge according to the present invention, looking from a lower cartridge half side.

The main cartridge body unit 5, forming the disc cartridge 1 according to the present invention, has its front side, as an inserting side end of the disc cartridge 1 into the disc recording and/or reproducing apparatus, formed as an arcuate section 7, as shown in FIGS. 1 to 3. This arcuate section 7 is formed to an arcuate shape corresponding to a semicircle of a constant radius R1 of the optical disc 2, housed within the disc housing section 6 of the main cartridge body unit 5, with the center of the disc as a center P0 of the semicircle, as shown in FIG. 2. That is, the arcuate section 7 is formed as a semicircle commensurate with the semicircle of the optical disc 2 housed within the main cartridge body unit 5.

The facing lateral sides of the main cartridge body unit 5, consecutive to the arcuate section 7 of the main cartridge body unit 5, are formed as sides 8, 9 parallel to each other, while the back side of the main cartridge body unit 5, lying opposite to the arcuate section 7, is formed as a uniformly smoothly curved section 10 having a radius larger than that of the arcuate section 7.

With the disc cartridge 1 of the present invention, the front side thereof, as an inserting side surface, is a substantially semicircular arcuate section 7 of the curvature larger than that of the other side, opposite thereto, so that, when the disc cartridge is inserted in the slot-in style via cartridge insertion/ejection opening, the direction of insertion into the disc recording and/or reproducing apparatus can be identified extremely readily. In particular, with the disc cartridge 1, reduced in size so as to be held in the user's palm, the direction of insertion can be identified by the sensual touch feeling, thus prohibiting mistaken insertion to enable correct loading on the disc recording and/or reproducing apparatus. Moreover, with the present disc cartridge 1, insertion into a slot-in type disc recording and/or reproducing apparatus may be facilitated, while positive insertion may be assured.

Moreover, the disc cartridge 1 may be further reduced in size, as compared to the optical disc 2, accommodated therein, by having the inserting end side formed as a substantially semicircular arcuate section 7, and by having the back side opposite to the arcuate section 7 similarly formed as the curved section 10.

At a mid part of the lower cartridge half 4, forming the lower surface of the main cartridge body unit 5, there is formed a circular center opening 12 for exposing a center hole 11 of the optical disc 2 housed in the main cartridge body unit 5, and the ambient part thereof, to outside, as shown in FIGS. 2 and 3. Into this center opening 12 is intruded a component, such as a turntable, of a disc rotating driving mechanism, provided to the disc recording and/or reproducing apparatus on which is loaded the disc cartridge 1.

In the lower cartridge half 4, forming the lower surface of the main cartridge body unit 5, there is formed an aperture for the head part 13, operating as a recording/reproducing aperture, as shown in FIGS. 2 and 3. The aperture for the head part 13 is provided to the lateral side 8 of the main cartridge body unit 5, and is formed as a rectangular aperture dimensioned so as to be large enough to permit a signal recording region of the optical disc 2 in the main cartridge body unit 5 to be exposed to outside across the inner and outer rims of the disc. That is, the aperture for the head part 13 is formed for being opened in the linear flat lateral side 8 different from the front side of the main cartridge body unit 5 provided with the arcuate section 7.

A shutter unit 15 for opening/closing the aperture for the head part 13 is movably mounted to the disc cartridge 1. The shutter unit 15 includes a flat-plate-shaped shutter member 16 of a rectangular shape large enough to close the aperture for the head part 13 and a retention part 17 of a U-shaped cross-section formed at the proximal side of the shutter member 16.

The shutter unit 15 is formed by punching and warping a thin metal sheet or by shaping a synthetic resin material.

Figure 4:
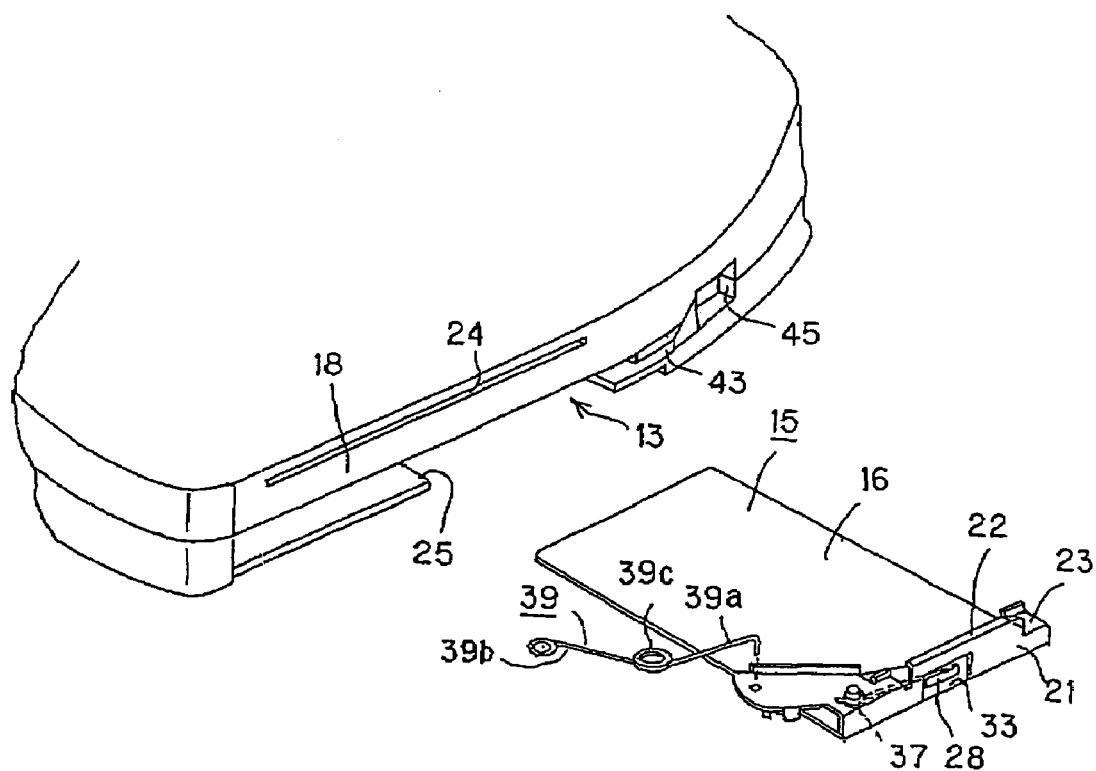
FIG. 4 is a perspective view showing a shutter unit and a main cartridge body unit carrying this shutter unit.

The shutter unit 15 is designed so that the upper cartridge half 3 of the cartridge body unit 5 is carried by the retention part 17. The shutter unit 15 is carried for movement in the directions indicated by arrows A and B for opening/closing the aperture for the head part 13, as shown in FIG. 2. That is, the shutter unit 15 is mounted for movement on the main cartridge body unit 5 by a slide guide 18 being carried by the retention part 17, as shown in FIG. 4. The slide guide 18 is formed by a portion of an upstanding peripheral wall section 3a of the upper cartridge half 3.

Figure 5:
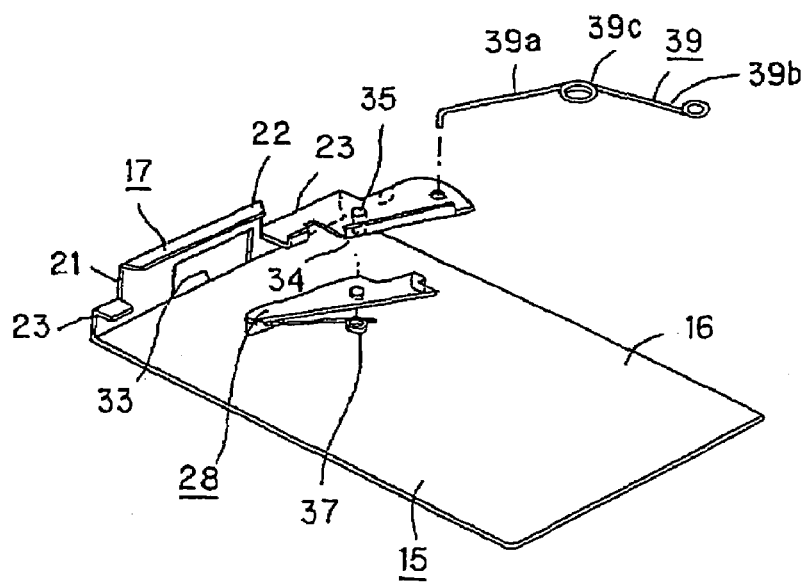
FIG. 5 is a perspective view showing a shutter unit and a shutter unit lock unit mounted on this shutter unit.

Referring to FIGS. 4 and 5, the retention part 17, provided to the shutter unit 15, is formed with a connecting piece 21 upstanding from the proximal end of the shutter unit 16, and a first engagement piece 22, bent towards the shutter member 16, is provided to the distal end of the connecting piece 21. On each side of the connecting piece 21, a second engagement piece 23, bent in an L-shape, is formed at a lower height than the first engagement piece 22. Meanwhile, the second engagement piece 23 is bent in an L-shape so that its distal end is protruded towards the first engagement piece 22.

Figure 6:
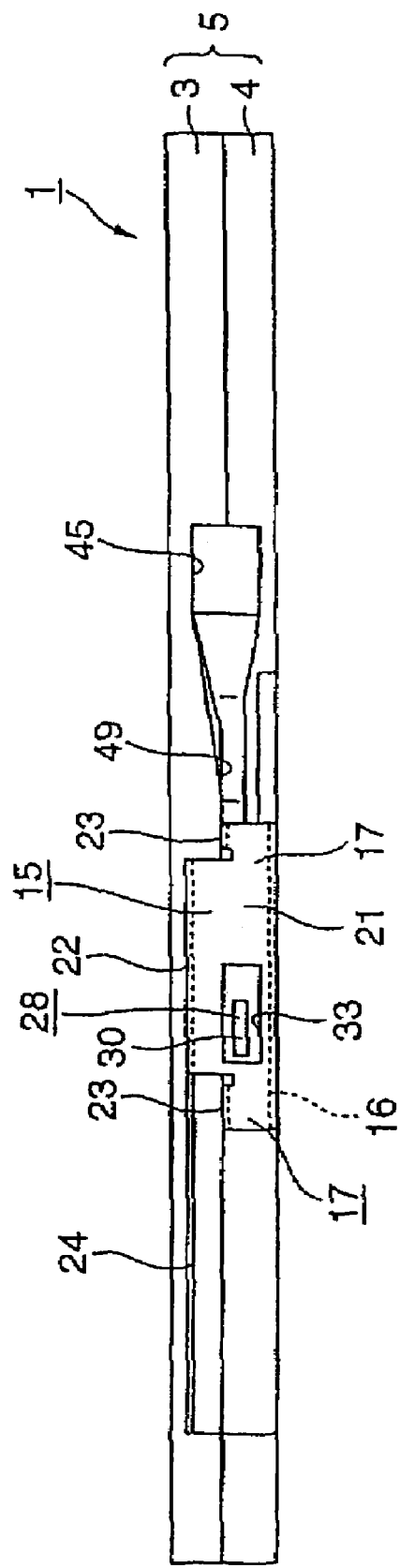
FIG. 6 is a side view showing the lateral side of the disc cartridge, carrying the shutter unit, according to the present invention.
Figure 7:
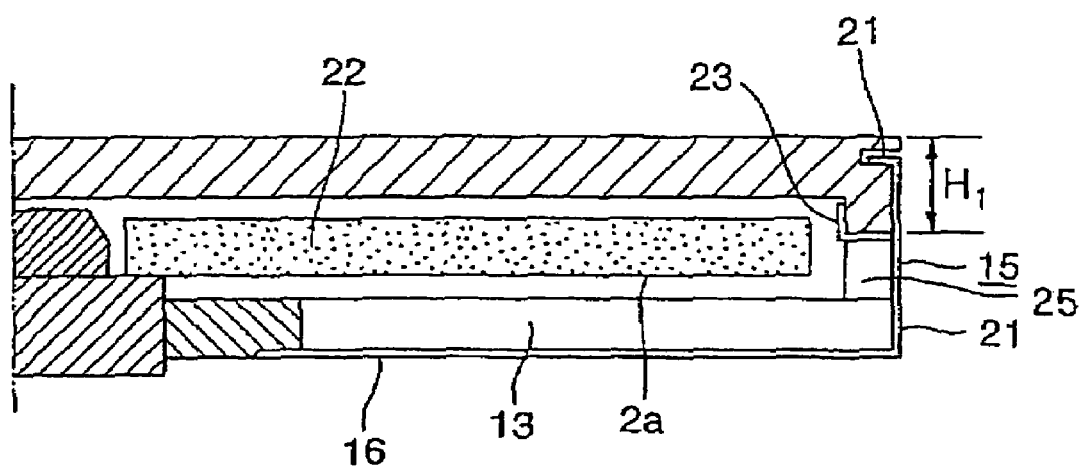
FIG. 7 is a cross-sectional view showing the shutter unit mounted to the main cartridge body unit.

The shutter unit 15 is arranged on the main cartridge body unit 5 so that the shutter member 16 is extended over the aperture for the head part 13, as shown in FIG. 2. At this time, the shutter unit 15 holds the retention part 17 in a clinching fashion by the first and second engagement pieces 22, 23, more specifically, by the first engagement piece 22 of the retention part 17 engaging in an engagement groove 24 formed in the lateral side of the slide guide 18 and by the L-shaped second engagement piece 23 engaging with the distal end of the slide guide 18, as shown in FIGS. 6 and 7. The shutter unit 15, carried in this manner, is moved in the directions indicated by arrows A and B in FIG. 2 for opening/closing the aperture for the head part 13, as the shutter unit is guided by the retention part 17.

The area of the lower cartridge half 4, through which is moved the shutter member 16, is formed with a recessed shutter slide part 19. This shutter slide part 19 is formed to a depth such that the shutter member 16 is not protruded from the surface of the main cartridge body unit 5.

In the disc cartridge 1 of the present invention, a cut-out 25 is formed in a region of the upstanding peripheral wall section 4a of the lower cartridge half 4 facing the aperture for the head part 13, as shown in FIGS. 5 and 7. That is, the aperture for the head part 13 is formed by exposing an area of the main cartridge body unit 5 extending from the inner rim up to the outer rim of the main cartridge body unit 5.

At least the part of the slide guide 18 of the upper cartridge half 3 facing the aperture for the head part 13 is of a height $H_1$ not protruding from the lower surface 2a of the optical disc 2, facing the lower cartridge half 4, when the optical disc 2 loaded in the disc cartridge 1 in position as to height on the cartridge loading section in the disc recording and/or reproducing apparatus is loaded in position on the turntable, as shown in FIG. 7.

With the above-described disc cartridge 1, when the shutter unit 15 is moved to open the aperture for the head part 13, the optical pickup, as a head part for reading out the information signals recorded on the optical disc 2, may be located in its entirety within the main cartridge body unit 5. In addition, when the optical pickup has been moved to a position of scanning the outer rim of the optical disc 2, the optical blocks other than an objective lens, condensing the light beam, used for scanning the signal recording area of the optical disc 2, may be located outside the main cartridge body unit 5, as the objective lens is located within the main cartridge body unit 5.

As a result, with the disc cartridge 1 of the present invention, the optical pickup may be located across the inner part and an outer part of the main cartridge body unit 5, as the optical pickup is at a position proximate to the optical disc 2. Hence, the signal recording area may be formed up to the outer rim of the optical disc 2, thereby increasing the recording capacity of the optical disc 2. Moreover, since the optical pickup may be at a position proximate to the optical disc 2, the numerical aperture NA of the objective lens may be larger, while the spot of the light beam condensed on the optical disc 2 may be smaller, thereby increasing the recording density of the information signals recorded on the optical disc 2. Since the recording density may also be improved with increase in the recording capacity, the optical disc in need of a preset recording capacity may be reduced in diameter. Since the optical disc 2 may be scanned as the optical pickup is positioned for movement across the inner and outer parts of the main cartridge body unit 5, the main cartridge body unit 5 may be reduced in size, whilst the disc recording and/or reproducing apparatus, employing the disc cartridge 1, may also be reduced in size.

In the disc cartridge 1, according to the present invention, the shutter unit 15, opening/closing the aperture for the head part 13, is mounted for movement along the flat lateral surface 8 of the main cartridge body unit 5, as shown in FIGS. 1 and 2. Thus, the shutter unit 15 is moved linearly with the retention part 17 contacting with the planar lateral surface 8, and hence may be moved in stability.

Since the aperture for the head part 13 is formed at a location facing the flat lateral side 8 of the main cartridge body unit 5, part of the lower cartridge half 4 carrying the cut-out 25 is also formed as a planar surface. Thus, the aperture for the head part 13, formed with the cut-out 25 and opened on the side of the lateral surface 8 of the main cartridge body unit 5 facing to outside, may be closed more reliably by the rectangular-shaped shutter unit 15, carrying the linear U-shaped retention part 17.

The disc cartridge 1 according to the present invention is provided with a lock unit 27 for prohibiting the movement of the shutter unit 15 when the shutter unit 15 has been moved to a position of closing the aperture for the head part 13. The lock unit 27 of the shutter unit 15 includes a lock lever 28, mounted for rotation to the shutter unit 15, and an engagement part 29 on the main cartridge body unit 5, engaged by this lock lever 28, as shown in FIGS. 5 and 8.

Figure 8:
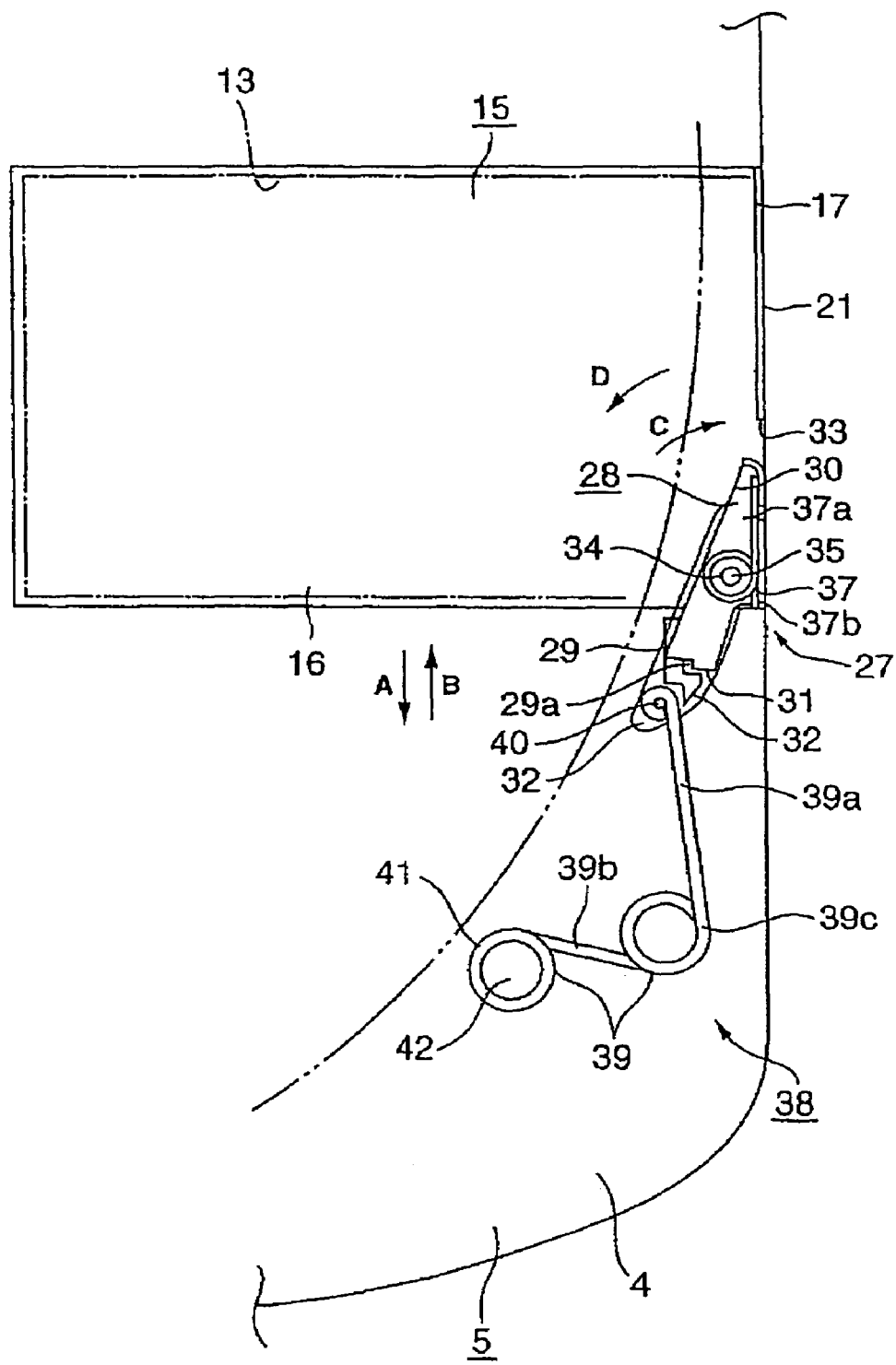
FIG. 8 is a plan view showing the shutter unit as it is locked by the shutter member lock unit.

The lock lever 28, forming a lock member of the lock unit 27, is formed as an elongated plate-shaped member, including an upstanding thrust part 30, extending along a lateral side edge thereof, and an upstanding engagement piece 31 on the opposite side for engagement by the engagement part 29, as shown in FIGS. 5 and 8. The lock lever 28 is rotationally mounted on a lock lever mounting piece 32 provided to the shutter unit 15. The lock lever mounting piece 32 is formed for protruding laterally of the shutter member 16 from the upper edge of the connecting piece 21 forming the slide guide 18 for the shutter unit 15.

The lock lever 28 is rotatably mounted about a pivot 35 as the center of rotation, with the thrust part 30 at one end thereof facing a rectangular window 33 formed at a mid portion of the connecting piece 21, and with a pivot 35, mounted upright on the lock lever mounting piece 32, engaging in a fulcrum opening 34 formed in the lock lever, as shown in FIGS. 1, 6 and 8. At this time, the engagement piece 31, provided to the opposite side of the lock lever 28, is protruded laterally of the shutter member 16 for extending along the lock lever mounting piece 32.

A window 33 formed in the connecting piece 21 of the shutter unit 15 is engaged by a shutter unit movement inhibiting spring, not shown, provided for inhibiting movement of the shutter unit 15, provided in turn to the disc recording and/or reproducing apparatus, to which is mounted the disc cartridge 1.

The lock lever 28, carried by the shutter unit 15, is rotationally biased by a rotationally energizing spring 37, coiled about the pivot 35, in a direction shown by an arrow C in FIG. 8, for protruding the thrust part 30 from the window 33. The rotationally energizing spring 37 is formed by a torsion coil spring, and has one arm section 37a retained by the thrust part 30, while having the other arm section 37b retained by the inner surface of the connecting piece 21 of the shutter unit 15, for rotationally biasing the lock lever 28 in the direction indicated by arrow C in FIG. 8.

The rotational position of the lock lever 28 by the rotationally energizing spring 37 is determined by abutment of the side of the lock lever 28 carrying the thrust part 30 against the connecting piece 21.

The shutter unit 15, carrying the lock lever 28 as described above, is mounted for movement relative to the main cartridge body unit 5, by having the retention part 17 carried by the upper cartridge half 3, as described above.

When the shutter unit 15 is at a position of closing the aperture for the head part 13, as shown in FIGS. 6 and 8, the lock lever 28 is rotated in the direction of arrow C in FIG. 8, under the biasing force of the rotationally energizing spring 37, for intruding the thrust part 30 into the window 33 formed in the connecting piece 21. At this time, the lock lever 28 inhibits movement of the shutter unit 15, by the engagement piece 31 at the other end thereof engaging with the mating engaging part 29, provided to the main cartridge body unit 5, while retaining the aperture for the head part 13 in a state of closure by the shutter unit 16.

The mating engaging part 29 of the main cartridge body unit 5 is provided to an area of the inner surface of the lower cartridge half 4, outside the area of the disc housing section 6, which area may be engaged by the engagement piece 31 of the lock lever 28 when the shutter unit 15 is in the closure position. The mating engaging part 29 is formed as one with the lower cartridge half 4. The mating engaging part 29 is formed with an engagement recess 29a opened on one side. In this engagement recess 29a is intruded and engaged the engagement piece 31 provided to the lock lever 28.

Figure 9:
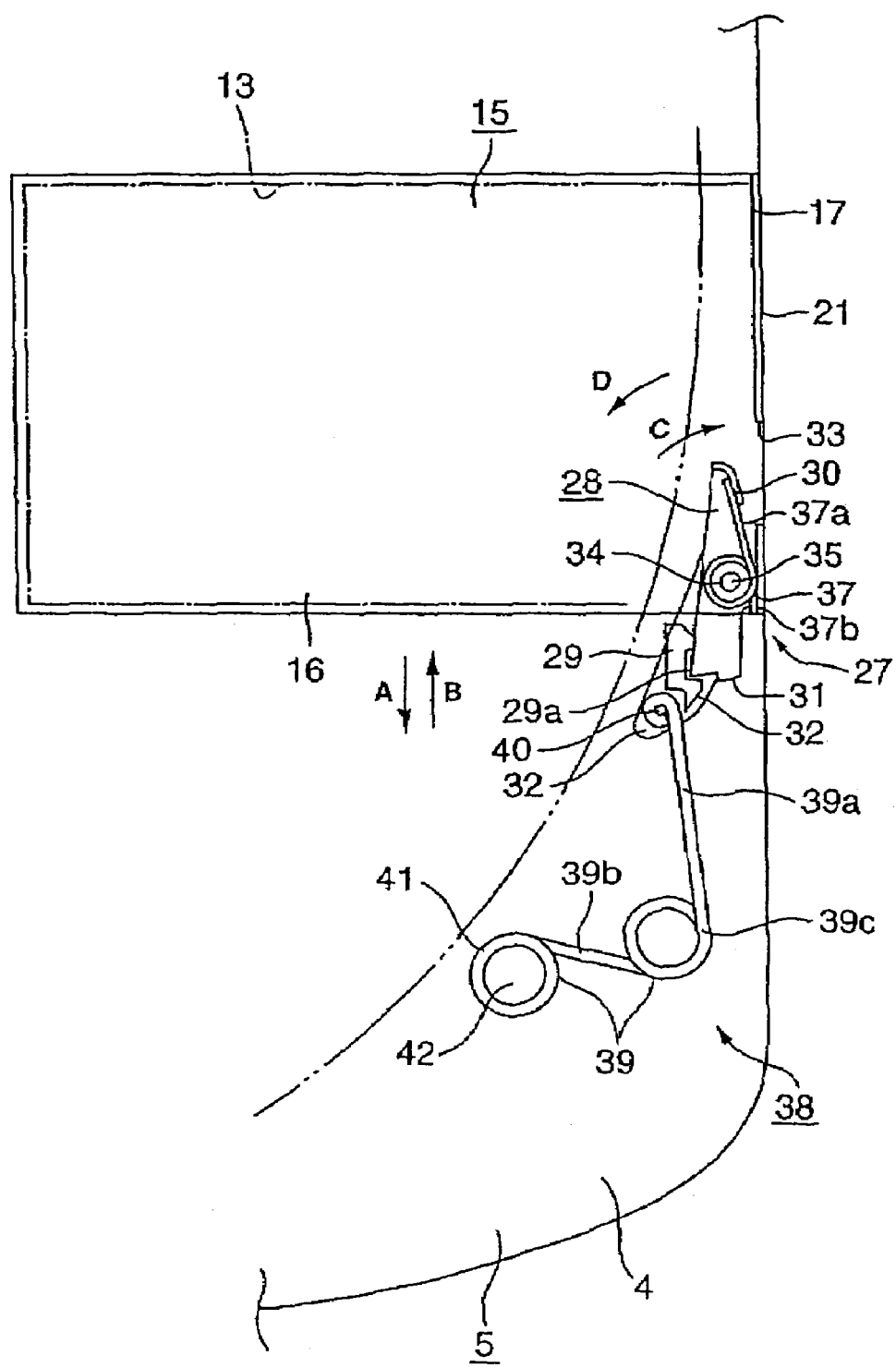
FIG. 9 is a plan view showing the shutter unit in the unlocked state.

When the disc cartridge 1 is introduced into the disc recording and/or reproducing apparatus, the lock lever 28, which has locked the shutter unit 15 in the closure position, is rotated in the direction indicated by arrow D in FIG. 8, against the bias of the rotational force energizing spring 37, by the thrust part 30 being thrust by the shutter unit movement inhibiting spring which is intruded into engagement with the window 33 formed in the connecting piece 21. When the lock lever 28 is rotated in the direction of the arrow D in FIG. 8, the engagement piece 31 is disengaged from the engagement recess 29a of the mating engaging part 29, as shown in FIG. 9, for detaching the engagement piece 31 from the engagement recess 29a of the mating engaging part 29, thereby unlocking the shutter unit 15. The shutter unit 15 is now movable along the direction of the arrow A in FIG. 2, that is, in a direction of opening the aperture for the head part 13.

Meanwhile, the opening/closure of the aperture for the head part 13 is performed by relative movement between the main cartridge body unit 5 and the shutter unit 15. The opening/closure of the aperture for the head part 13 will be explained in detail subsequently.

With the above-described lock unit 27 for the shutter unit 15, in which the lock lever 28, locking the shutter unit 15 in the closure position, is mounted to the shutter unit 15, movable with respect to the main cartridge body unit 5, the lock lever may be moved in unison with the shutter unit 15 to follow up with the opening/closure of the aperture for the head part 13. As a result, the lock lever 28 may be placed such that, when the shutter unit 15 is in the position of closing the aperture for the head part 13, at least the thrust part 30 overlies the aperture for the head part 13, thus enabling the size of the disc cartridge 1 to be reduced. That is, the space in which to arrange the lock lever 28 in its entirety needs to be provided to the main cartridge body unit 5, in case the lock lever 28 is provided to the main cartridge body unit 5. This necessity may be obviated with the disc cartridge 1 of the present invention, such that it is only sufficient to provide solely the mating engaging part 29, engaged by a portion of the lock lever 28, to the main cartridge body unit 5, with the consequence that the main cartridge body unit may further be reduced in size.

The disc cartridge 1, according to the present invention, may further be provided with a shutter opening/closure unit 38 which implements reliable movement of the shutter unit 15 opening/closing the aperture for the head part 13 and which reliably holds the shutter unit 15 in the position of opening or closing the aperture for the head part 13.

This shutter opening/closure unit 38 is formed using a bi-directional energizing unit for selectively energizing the shutter unit 15 into movement in two directions, viz. in a direction of opening the aperture for the head part 13 and in a direction of closing the aperture for the head part. Specifically, the bi-directional energizing unit is formed by a torsion coil spring 39, as shown in FIG. 8. This torsion coil spring 39, mounted between the shutter unit 15 and the main cartridge body unit 5, is arranged at a location towards which the shutter unit 15 is moved in the direction of opening the aperture for the head part 13, as shown in FIG. 8. Specifically, the torsion coil spring 39 is mounted by having the distal end of an arm section 39a engaged in an engagement opening 40 formed in the distal end of the lock lever mounting piece 32 and by having a ring 41 at the distal end of the other arm section 39b engaged by a support pin 42 protuberantly formed on the inner surface of the main cartridge body unit 5.

Figure 10:
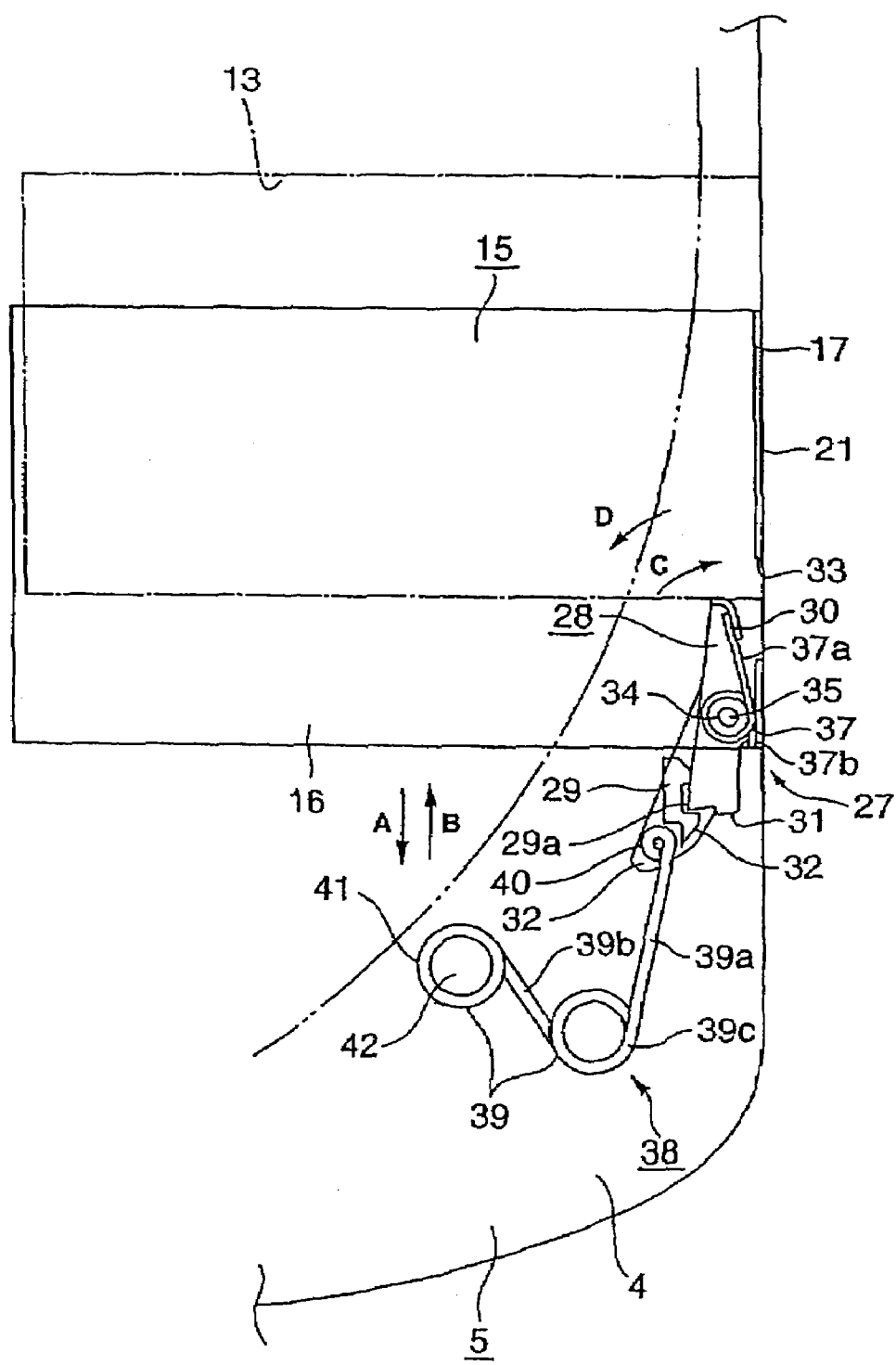
FIG. 10 is a plan view showing the state in which the shutter member is being moved in a direction of opening an aperture for a head unit.
Figure 11:
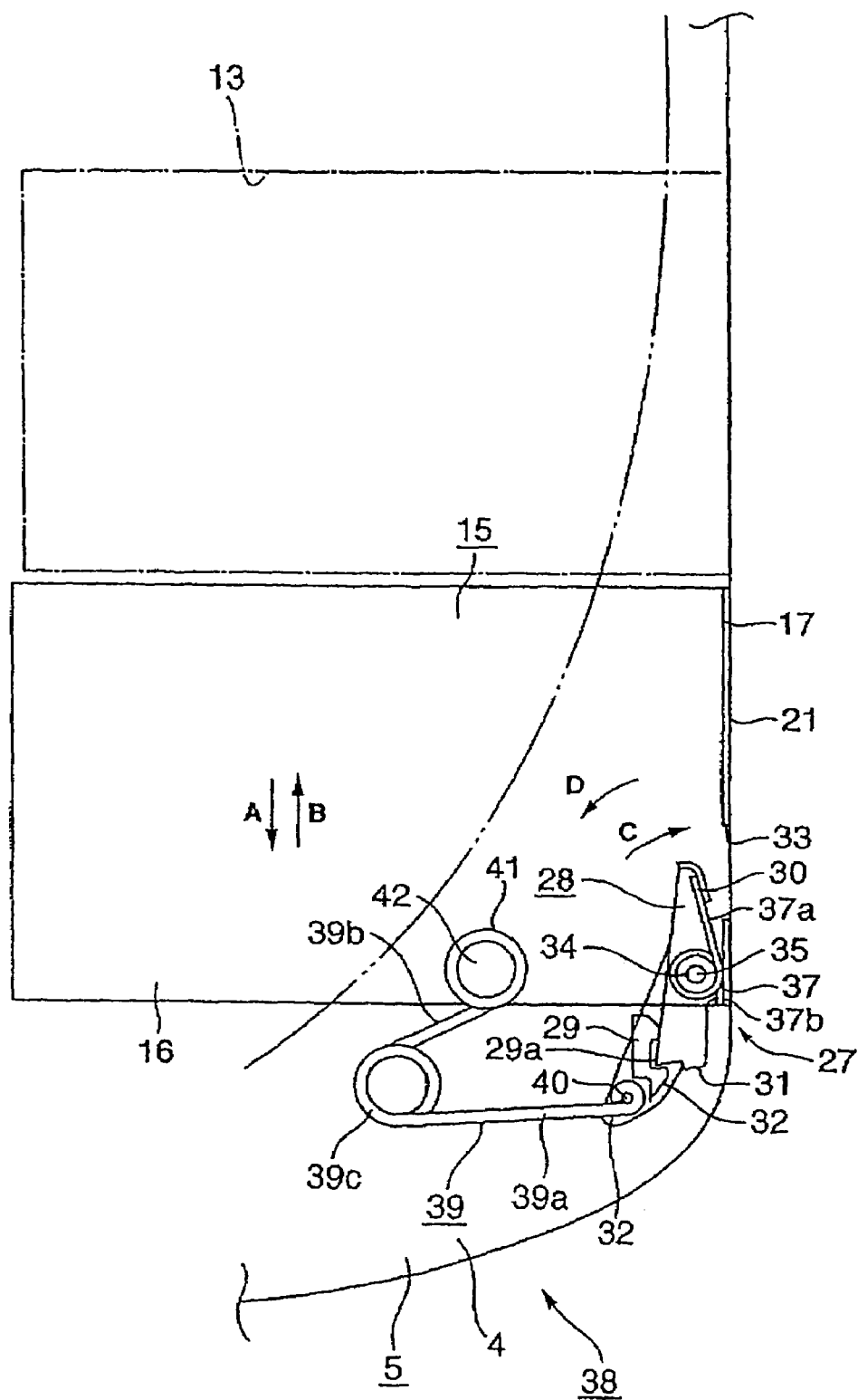
FIG. 11 is a plan view showing the state in which the shutter unit has been moved to the position of opening the aperture for the head unit.
Figure 12:
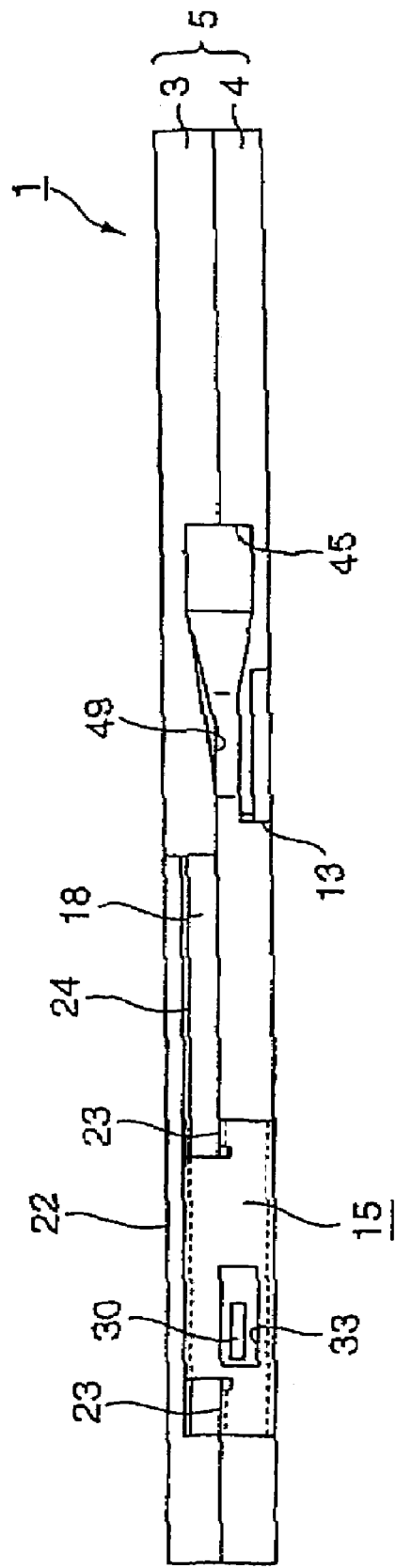
FIG. 12 is a side view of the disc cartridge showing the opened state of the aperture for the head unit.

When the torsion coil spring 39 is at the position in which the shutter member 15 closes the aperture for the head part 13, the torsion coil spring 39 biases the shutter unit 15 in the direction indicated by the arrow B in FIG. 8 for retaining the state of closing the aperture for the head part 13. When the disc cartridge 1 is loaded on the disc recording and/or reproducing apparatus, and the shutter unit 15, released from the locked state by the lock unit 27 for the shutter unit, is moved relative to the main cartridge body unit 5 in the direction of the arrow A in FIG. 8 for opening the aperture for the head part 13, a coil part 39c, formed centrally of the torsion coil spring 39 in an unfixed state, is moved in the direction of arrow A, along which is moved the shutter unit 15. When the coil part 39c is further moved along the direction of the arrow A and is moved beyond the location of a support pin 42 along the direction of movement of the shutter unit 15, as shown in FIG. 10, the biasing direction of the torsion coil spring 39 is reversed. On reversion of the biasing direction, the torsion coil spring 39 biases the shutter unit 15 into movement along the arrow A in FIG. 10. Thus, the shutter unit 15 is moved in a direction of opening the aperture for the head part 13, such as to retain the aperture for the head part 13 in the opened position, as shown in FIGS. 11 and 12.

When the disc cartridge 1, in a state in which the shutter unit 15 retains the aperture for the head part 13 in the opened position, is taken out from the disc recording and/or reproducing apparatus, by way of performing the operation for ejection, the shutter unit 15 is moved along the direction of arrow B in FIG. 10, relative to the main cartridge body unit 5, with the center coil part 39c being similarly moved along the direction of arrow B. When the shutter unit 15 is further moved along the direction of arrow B, such that it surpasses the location of the support pin 42 along the direction of movement of the shutter unit 15, the biasing direction of the torsion coil spring 39 is reversed. On reversion of the biasing direction, the torsion coil spring 39 biases the shutter unit 15 into movement along the arrow B in FIG. 9, such that the shutter unit 15 is moved in the direction of closing the aperture for the head part 13, thereby retaining the aperture for the head part in the closed state.

The shutter unit 15, biased by the torsion coil spring 39, forming the bi-directional energizing unit, is carried in the position of closing the aperture for the head part 13 and in the position of opening the aperture for the head part 13, under the biasing force of the torsion coil spring 39, and hence may reliably be maintained in the position of closing or opening the aperture for the head part 13.

In the disc cartridge 1, according to the present invention, provided not only with the lock unit 27 for the shutter unit, locking the shutter unit 15 in the closed position, but also with the shutter opening/closure unit 38, having the bi-directional energizing unit for selectively biasing the shutter unit 15 into movement in the two directions, the shutter unit 15 may be reliably retained in the position of closing the aperture for the head part 13, while the reliable opening/closure operation for the aperture for the head part 13 may be achieved.

For reliably closing the aperture for the head part 13, it is only sufficient to provide the lock unit 27 for the shutter unit.

In the disc cartridge 1, according to the present invention, the lateral surface 8 of the main cartridge body unit 5, carrying the shutter unit 15, is formed with a guide groove 49, into which is intruded a shutter unit releasing piece, provided to the disc recording and/or reproducing apparatus, as shown in FIGS. 1, 6 and 12.

On both sides of the arcuate section 7 of the disc cartridge 1 of the present invention, operating as an inserting side thereof into the recording and/or reproducing apparatus, there are provided first and second engagement recesses 45, 46 for engagement by a part of the cartridge loading unit of the disc recording and/or reproducing apparatus, on which is loaded the disc cartridge 1, or by a part of a loading controlling member provided to the disc recording and/or reproducing apparatus, as shown in FIGS. 1 and 2.

In a position proximate to the other lateral side 9 of the arcuate section 7, there is formed a third engagement recess 47 engaged by a portion of an ejection unit, provided to the recording and/or reproducing apparatus, as shown in FIGS. 1 and 2. In the flat lateral side 9 of the main cartridge body unit 5, provided with the engagement recess 47, there is formed a fourth engagement recess 48 used for loading the disc cartridge 1.

In the disc cartridge 1 of the present invention, there are also provided discriminating holes or recesses in the lateral sides 8, 9 or the bottom of the disc cartridge 5, for discriminating the optical disc 2 housed in the disc cartridge, as necessary.

Figure 13:
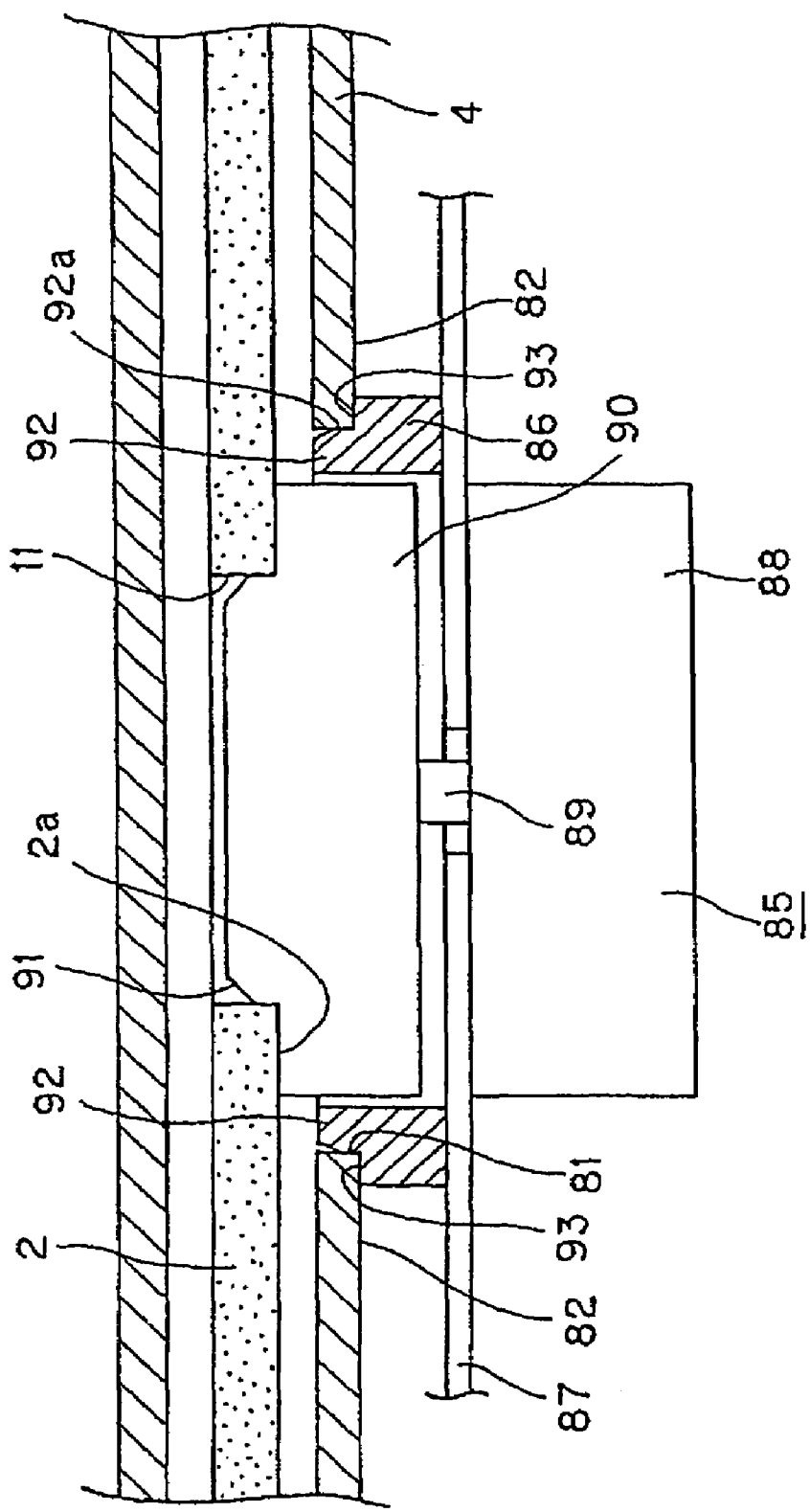
FIG. 13 is a cross-sectional view showing the state in which the disc cartridge of the present invention has been loaded in position on a loading support unit.

In the disc cartridge 1 according to the present invention, an inner peripheral surface 81 of the center opening 12, formed centrally of the lower cartridge half 4, forming the lower surface of the main cartridge body unit 5, is used as a mounting reference surface in the planar direction in mounting the disc cartridge to the recording and/or reproducing apparatus, as shown in FIG. 13. The rim of the center opening 12 is used as a mounting reference surface 82 along the height direction.

The recording and/or reproducing apparatus for mounting the above-described disc cartridge 1 thereon is configured as shown in FIG. 13. The disc recording and/or reproducing apparatus, shown in FIG. 13, includes a disc rotation driving unit 85, on which the optical disc 2 housed in the disc cartridge 1 is mounted in position, and a loading support member 86 provided for surrounding this disc rotation driving unit 85 for loading the disc cartridge 1 in the correct loading position in the planar direction and along the height-wise direction.

The disc rotation driving unit 85 includes a spindle motor 88, mounted on a base plate 87, and a turntable 90 mounted to the foremost part of a spindle shaft 89 for rotation in unison with the spindle shaft 89. The center part of the turntable 90 is formed as a centering section 91 tapered towards its foremost end. The centering section is engaged in the center hole 11 bored at the center of the optical disc 2. The centering section operates for confounding the center of rotation of the optical disc 2 with that of the turntable 90.

The optical disc 2, housed in the disc cartridge 1, has the center hole 11 engaged by the centering section 91, while having the rim 2a of the center hole 11 carried by the turntable 90. In this manner, the optical disc is loaded for rotation in unison with the turntable 90, as the disc has the center of rotation in common with that of the turntable 90, in such a manner that the optical disc is rotated in unison with the turntable 90.

The loading support member 86, provided to the outer perimeter of the disc rotation driving unit 85, is ring-shaped and is mounted on the base plate 87. The loading support member 86 is provided with a ring-shaped center fitting protrusion 92 fitted into the center opening 12 of the disc cartridge 1. This ring-shaped center fitting protrusion 92 is of an outer diameter approximately equal to the inner diameter of the center opening 12. That is, the fitting protrusion 92 is dimensioned to be abutted against and fitted to an inner peripheral surface 81 of the center opening 12. Consequently, an outer peripheral surface 92a of the fitting protrusion 92 carries the inner peripheral surface 81 of the center opening 12 for positioning the disc cartridge 1, carried by the loading support member 86, in the horizontal direction.

The outer peripheral surface, at the foremost end of the fitting protrusion 92, is formed as a tapered surface 92b tapered towards the foremost end. With the foremost end of the fitting protrusion 92 formed as the tapered surface 92b, position registration of the disc cartridge 1 relative to the fitting protrusion 92 of the disc cartridge 1 may readily be achieved when the fitting protrusion 92 is fitted in the center opening 12.

The proximal end of the fitting protrusion 92 is formed with a cartridge support part 93 for carrying the mounting reference surface 82 of the rim of the center opening 12. The cartridge support part 93 is formed as a flat surface of high verticality with respect to the spindle shaft 89. This cartridge support part 93, carrying the mounting reference surface 82, is responsible for positioning the disc cartridge 1 along the height.

The disc cartridge 1, according to the present invention, is mounted on the loading support member 86, with the fitting protrusion 92 fitted into the center opening 12 and with the mounting reference surface 82 of the center opening 12 carried by the cartridge support part 93, so as to be positioned in two directions crossing each other, namely in the planar direction and along the height.

Hence, the disc cartridge 1 according to the present invention may have its mounting position set by the center opening 12 and its near-by portion, and may be mounted in this state on the recording and/or reproducing apparatus, so that, unlike the conventional disc cartridge, it is unnecessary to provide an ejection setting reference opening on the outer periphery of the disc housing section 6 the optical disc 2 is housed in. Consequently, there is no necessity of providing an area for a positioning reference opening, and hence the disc cartridge may further be reduced in size.

Moreover, with the recording and/or reproducing apparatus, employing the disc cartridge according to the present invention, there is no necessity for providing means for positioning a disc cartridge, such as reference pin, in the vicinity of the disc drive unit, thus enabling the apparatus itself to be reduced in size.

An instance of the disc recording and/or reproducing apparatus, employing the disc cartridge 1 according to the present invention, will now be explained.

Figure 14:
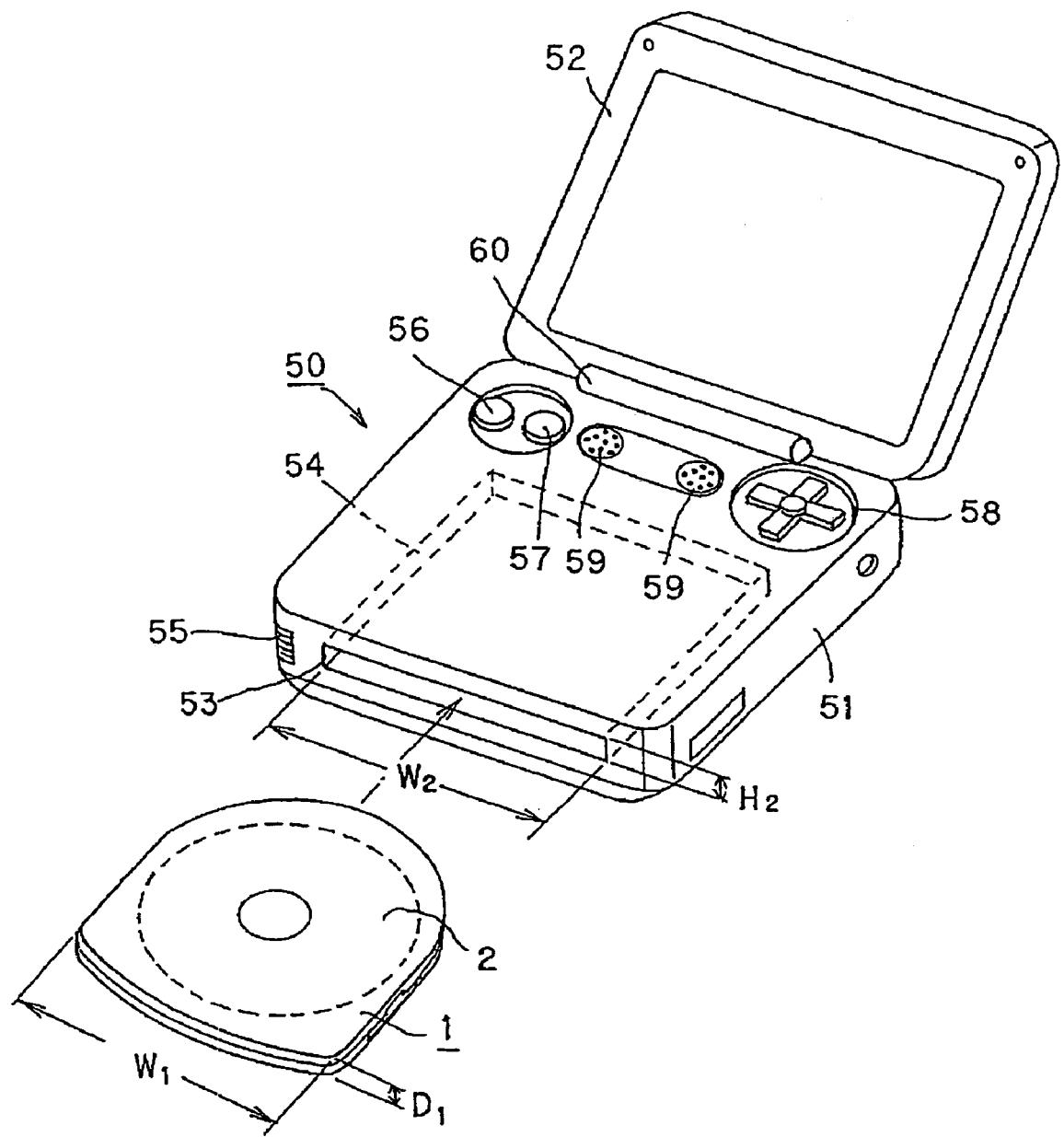
FIG. 14 is a perspective view showing an instance of a disc drive device employing a disc cartridge according to the present invention.

In the disc cartridge 1 of the present invention, there is housed an optical disc 2, having recorded therein video data or program data for executing e.g. a television game. Thus, as the disc recording and/or reproducing apparatus, employing the disc cartridge 1 of the present invention, having housed this sort of the optical disc 2, there is employed a disc drive device 50 comprising a main body unit 51 and a display 52, as shown in FIG. 14. The main body unit 51 mounts the disc cartridge 1, and encloses a disc drive unit for reproducing at least data recorded on the optical disc 2 and the display 52 is used for demonstrating picture data or data of letters/characters as reproduced from the optical disc 2.

The disc drive device 50, shown in FIG. 14, includes, in the main body unit 51, enclosing a disc drive unit, a cartridge loading unit provided with a cartridge holder for mounting the disc cartridge 1 on the disc drive unit. In the front surface, forming one lateral side, of the main body unit 51, there is formed a cartridge insertion/ejection opening 53 via which the disc cartridge 1 is introduced into the cartridge holder and via which may be ejected the disc cartridge 1 loaded on the cartridge holder. The cartridge insertion/ejection opening 53 is formed as a rectangular opening just large enough to permit the insertion/ejection of the disc cartridge 1, with a width W2 only slightly larger than a width W1 of the disc cartridge 1 introduced therein, and with a height H2 only slightly larger than the thickness D1 of the disc cartridge 1. A cartridge holder 54 is provided facing the cartridge insertion/ejection opening 53 in the main body unit 51.

An ejection button 55 is provided towards one end on the front surface side of the main body unit 51 for ejecting the disc cartridge 1 held by the cartridge holder 54.

Towards one side on the upper surface of the main body unit 51, there are provided actuating buttons 56, 57 of a control switch used for running e.g. a television game Towards the opposite side, there are provided a control key 58 for scrolling a picture demonstrated on the display 52 and a loudspeaker 59 for radiating audio signals reproduced from the optical disc 2.

The main body unit 51 is also provided with a control bobbin for a play button, not shown, for controlling the disc drive unit, and an actuating button for the power supply, again not shown.

The display 52 is mounted to the back surface side of the main body unit 51, opposite to its front side provided with the cartridge insertion/ejection opening 53, so that the display may be rotated relative to the main body unit 51 via hinge unit 60. The display 52 may be rotated towards the main body unit 51 and thereby folded over the upper surface of the main body unit 51. The display 52 is formed using a liquid crystal display panel.

The state in which the disc cartridge 1 of the present invention is loaded on the disc drive device 50, constructed as described above, will now be explained.

For loading the disc cartridge 1 to the disc drive device 50, the disc cartridge is introduced into the main body unit 51, via cartridge insertion/ejection opening 53, with the foremost portion of the disc cartridge carrying the arcuate section 7 as an introducing end, so as to be held by the cartridge holder 54, as shown in FIG. 14.

Meanwhile, the introducing end into the cartridge insertion/ejection opening 53 of the disc cartridge 1 of the present invention is formed as a semicircular arcuate section 10, so that, even if the disc cartridge 1 is introduced with a centerline P2 along the widthwise direction appreciably inclined with respect to a centerline P1 along the widthwise direction of the cartridge insertion/ejection opening 53, the disc cartridge may reliably be introduced into the cartridge insertion/ejection opening 53 so as to be held by the cartridge holder 54.

Figure 15:
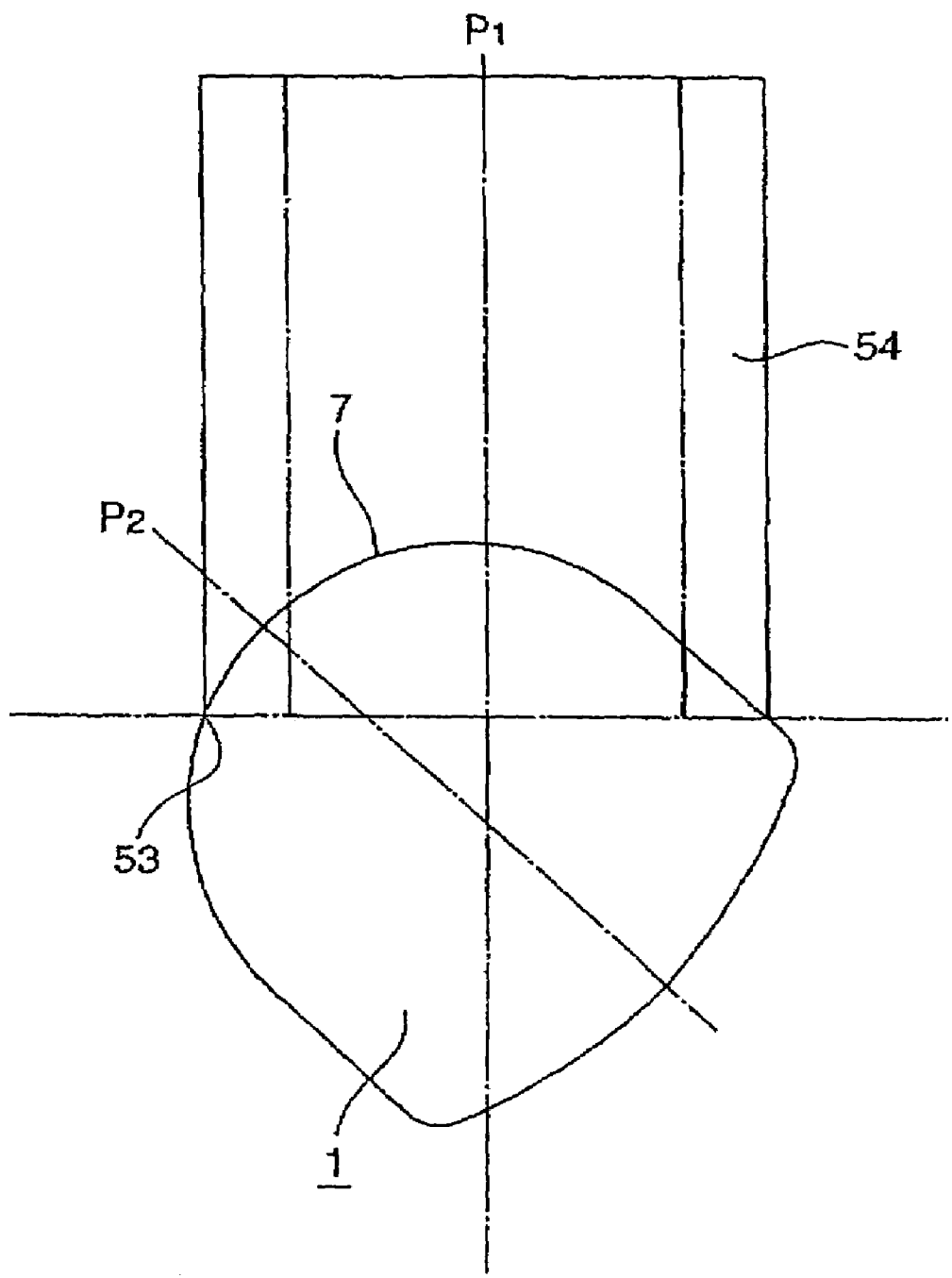
FIG. 15 is a plan view showing the state in which the disc cartridge is introduced into a cartridge loading/unloading opening of the disc drive device, as the disc cartridge is inclined in one direction relative to the opening.
Figure 16:
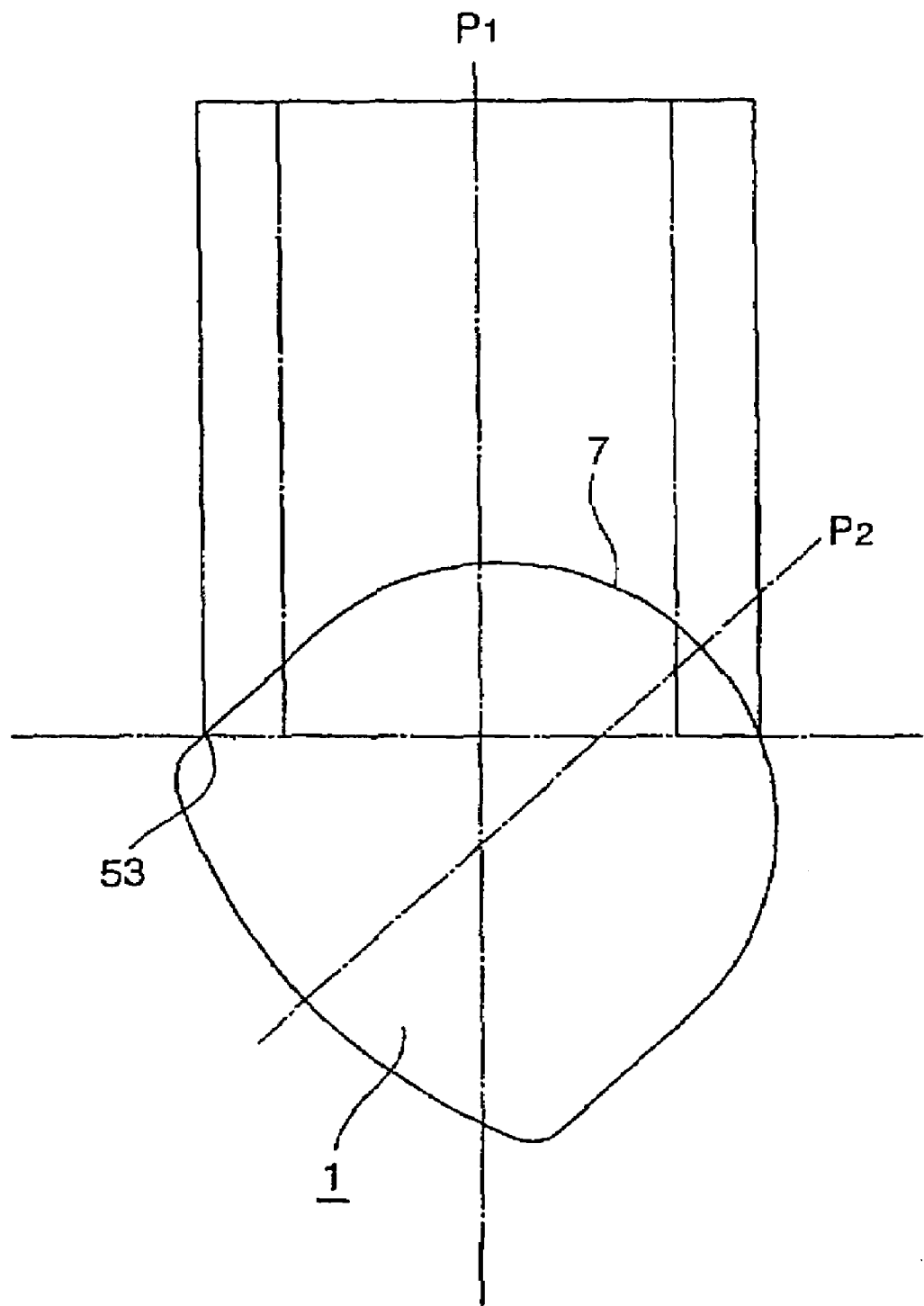
FIG. 16 is a plan view showing the state in which the disc cartridge is introduced into the cartridge loading/unloading opening of the disc drive device, as the disc cartridge is inclined in another direction relative to the opening.
Figure 17:
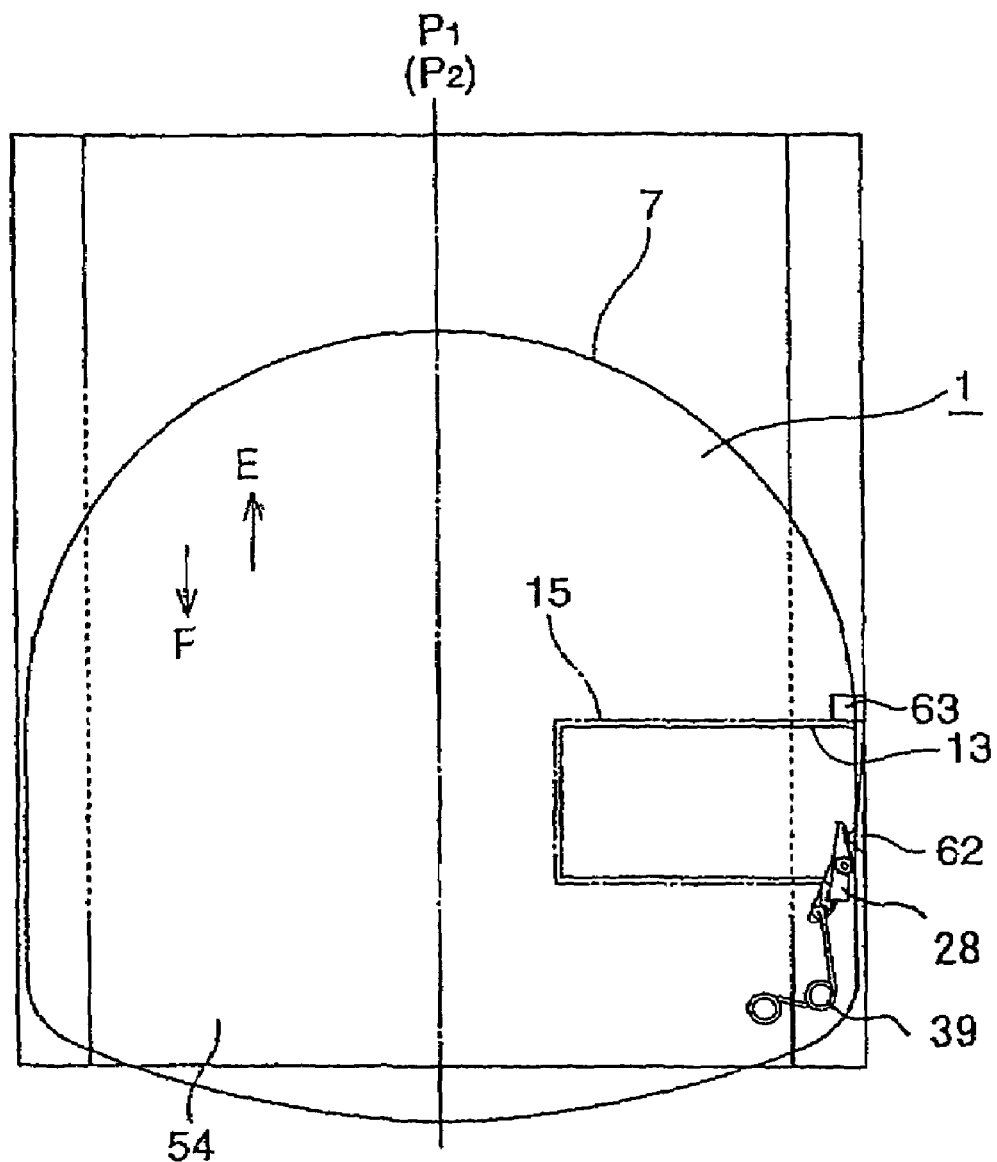
FIG. 17 is a plan view showing the state in which the disc cartridge is introduced into a cartridge holder as the disc cartridge is controlled in its orientation.

That is, even in case the disc cartridge 1, having its inserting end formed as a semicircular arcuate section 10, is introduced into the cartridge insertion/ejection opening 53, with the widthwise centerline P2 inclined up to approximately 45° towards left or right with respect to the widthwise centerline P1 of the cartridge insertion/ejection opening 53, the semicircular arcuate section 10 can be introduced into the inside of the main body unit 51, as shown in FIG. 15 or 16. At this time, in the course of insertion into the cartridge insertion/ejection opening 53, the disc cartridge 1 may be rotated, about a part of the arcuate section 10, abutting against one of the lateral sides of the cartridge insertion/ejection opening 53, as the center of rotation, in a direction in which the centerlines P1 and P2 will be confounded with each other, for rectifying its orientation, as shown in FIG. 17. Hence, the disc cartridge 1 of the present invention may reliably be loaded on the cartridge holder 54, even in case the direction of insertion into the cartridge insertion/ejection opening 53 is deviated significantly.

Figure 18:
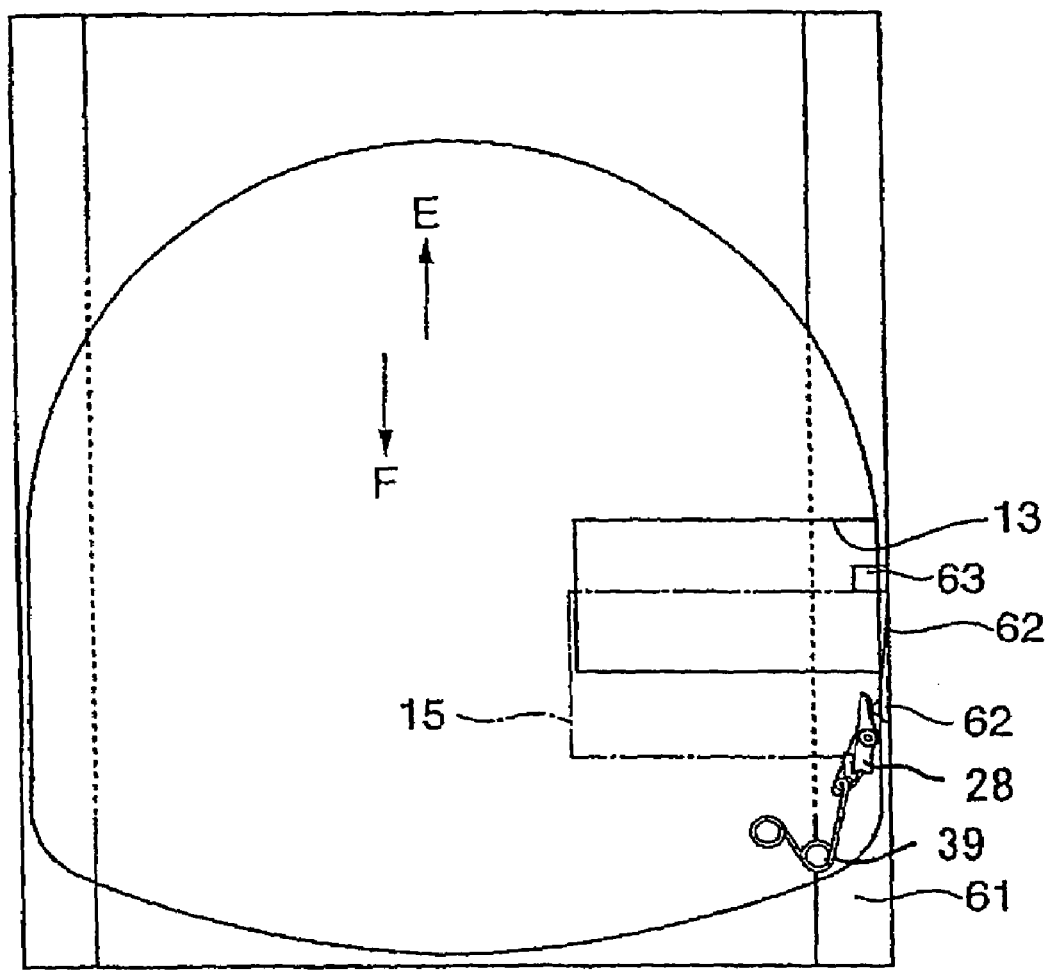
FIG. 18 is a plan view showing the state in which the disc cartridge has been introduced into the cartridge holder and in which the shutter unit has been unlocked.

The disc cartridge 1, thus introduced into the cartridge holder 54, is further introduced into the cartridge holder 54, whereby the shutter unit 15 is moved relative to the main cartridge body unit 5 to open the aperture for the head part 13. That is, when the disc cartridge 1 is introduced halfway into the inside of the cartridge holder 54, as shown in FIG. 18, part of a shutter member movement prohibiting spring 62, formed by segmenting part of the sidewall of a cartridge support part 61 of an L-shaped cross-section, provided to one lateral side of the cartridge holder 54, is intruded into the window 33 formed in the connecting piece 21 of the shutter unit 15 to thrust the upstanding thrust part 30 to cause rotation of the lock lever 28 in the direction of arrow D in FIG. 9. When rotated in the direction of arrow D in FIG. 9, the lock lever 28 is disengaged from the engagement part 29 of the engagement piece 31 to unlock the shutter unit 15 from the main cartridge body unit 5. When unlocked from the main cartridge body unit 5, the shutter unit 15 is movable relative to the main cartridge body unit 5.

The cartridge holder 54, on which is loaded the disc cartridge 1 according to the present invention, is further provided with a shutter releasing piece 63. The shutter releasing piece 63 is provided at such a position in which, when the disc cartridge 1 is introduced into a position of unlocking the shutter unit 15, the shutter releasing piece 63 is intruded into the guide groove 49, formed in the lateral surface 8 of the main cartridge body unit 5, so as to be abutted against a lateral side of the shutter unit 15.

Figure 19:
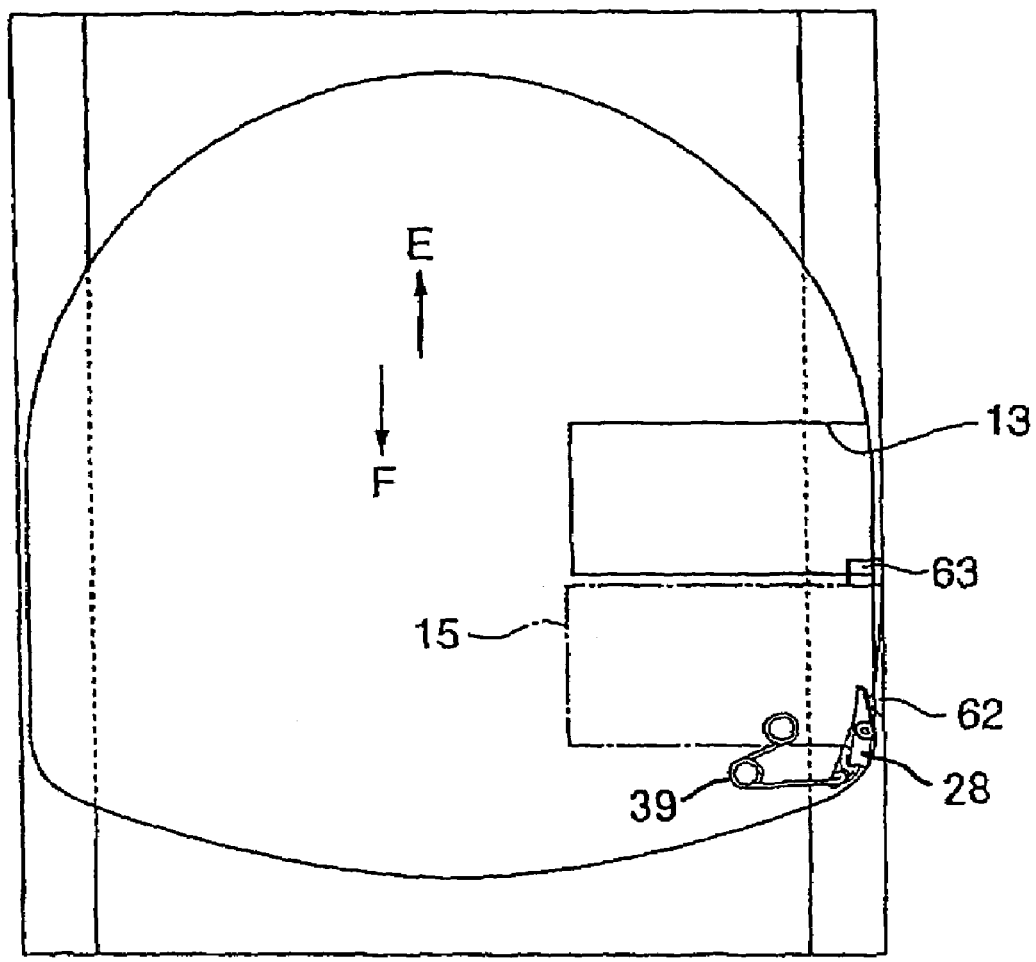
FIG. 19 is a plan view showing the state in which the disc cartridge has been introduced into the cartridge holder, the shutter unit has been moved and the aperture for the head unit has been opened.

When the disc cartridge 1 is introduced into the cartridge holder 54 up to a position of unlocking the shutter unit 15, the shutter releasing piece 63 is abutted against one lateral side of the shutter unit 15 to prohibit movement of the shutter unit 15 relative to the main cartridge body unit 5, as shown in FIG. 18. If the disc cartridge 1 is introduced from the position shown in FIG. 18 further into the interior of the cartridge holder 54, in a direction of arrow E, the main cartridge body unit 5 is moved in the direction indicated by arrow E, thereby opening the aperture for the head part 13, as shown in FIG. 19.

If, as the movement of the shutter unit 15 is prohibited, the main cartridge body unit 5 is moved in the direction indicated by arrow E in FIG. 17, the torsion coil spring 39, forming the shutter opening/closure unit 38, is biased, as shown in FIGS. 9 and 10, referred to previously. If the main cartridge body unit 5 is moved in the direction indicated by arrow E in FIG. 18, such that the coil part 39c has become biased as far as a position where the coil part 39c surpasses the position of the support pin 42, located at a position towards which is moved the shutter unit 15, the biasing direction of the torsion coil spring 39 is reversed to cause movement of the shutter unit 15 in the direction indicated by arrow F in FIG. 18, that is, opposite to the direction of movement of the main cartridge body unit 5, thus opening the aperture for the head part 13, as shown in FIGS. 11, 12 and 18, referred to above. Since the shutter unit 15 is biased by the torsion coil spring 39 at this time for opening the aperture for the head part 13, the aperture for the head part 13 can reliably be maintained in the opened state.

The disc cartridge 1, introduced into the cartridge holder 54, with the aperture for the head part 13 opened by the above-described processing, is loaded on the loading support member 86, as the disc cartridge is positioned in the planar direction and along the height. The disc drive unit then is driven for reproducing the optical disc 2.

For ejecting the disc cartridge 1, loaded on the disc drive device 50, after reproduction of the optical disc 2, the ejection button 55 is actuated. When the ejection button 55 is actuated, the disc cartridge 1, loaded on the cartridge loading section, is ejected. The disc cartridge 1 is restored to its initial state by the reverse of the above-described operations. That is, the shutter unit 15 is moved relative to the main cartridge body unit 5 and the aperture for the head part 13 is closed and maintained in the closed position. Simultaneously with this restoration of the shutter unit 15 to the closure position, the disc cartridge is ejected out of the cartridge insertion/ejection opening 53 to end up with ejection of the disc cartridge 1.

Figure 20:
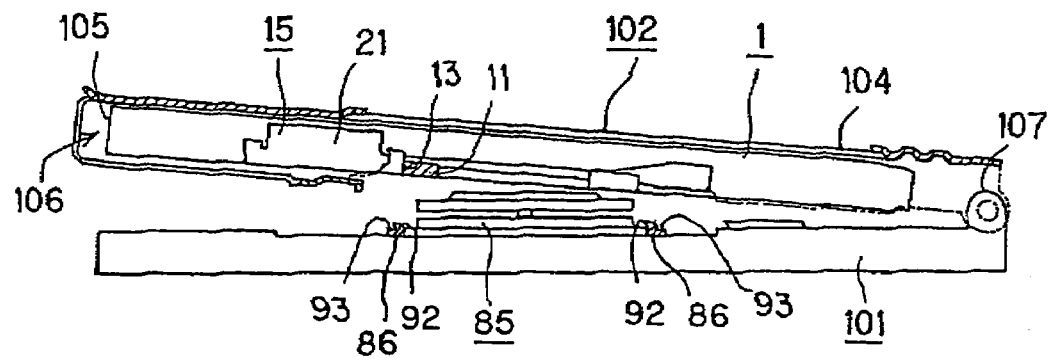
FIG. 20 is a side view showing a disc recording and/or reproducing apparatus in which the disc cartridge is loaded using a rotationally actuated cartridge holder.

The above-described disc recording and/or reproducing apparatus of the present invention may also be configured for loading the disc cartridge 1 on a cartridge loading section 103 provided on a base 101, using a cartridge holder 102 rotatably carried by the base 101, provided with the disc rotation driving unit 85, as shown in FIG. 20.

In this modification of the disc recording and/or reproducing apparatus, there is provided a loading support member 86, similar to the loading support member of the previous embodiment, for positioning and loading the disc cartridge 1 in position along the planar direction and along the height-wise direction.

The cartridge holder 102, provided to the disc recording and/or reproducing apparatus, is formed to a rectangular profile and is dimensioned to hold therein the disc cartridge 1 according to the present invention. On both opposite sides of a top plate 104, there is provided a cartridge support member 105 of an L-shaped cross-section. The cartridge holder 102 includes an opened front side operating as a cartridge insertion/ejection opening 106. The disc cartridge 1 of the present invention is introduced into or ejected from the cartridge holder 102, via cartridge insertion/ejection opening 106, with the arcuate section 7 on the front side as an inserting end.

The cartridge holder 102 is rotatably carried by a base 72 via a pivot 107 provided to each side on the back surface opposite to the front side thereof provided with the cartridge insertion/ejection opening 106.

The cartridge holder 102 used in the disc recording and/or reproducing apparatus of the present embodiment is provided with a shutter opening unit, not shown, for causing movement of the shutter unit 15 for opening the aperture for the head part 13 when the disc cartridge 1 is introduced into the cartridge holder 102. Thus, when the disc cartridge 1 is introduced into the cartridge holder 102, the movement of the shutter unit 15 is induced to open the aperture for the head part 13.

The disc cartridge 1 is introduced into or ejected from the cartridge holder 102 as the cartridge holder 102 is rotated away from the base 101, as shown in FIG. 20. The disc cartridge 1, inserted into and held by the cartridge holder 102, is rotated towards the base 101 along with the cartridge holder 102, and may thereby be loaded in position on the cartridge loading section 103.

Figure 21:
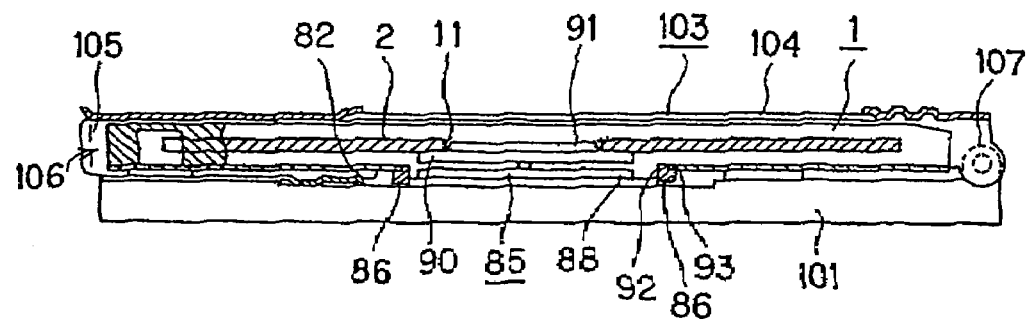
FIG. 21 is a side view showing the state in which the disc cartridge has been loaded in a cartridge loading section as the disc cartridge is held by the cartridge holder.

When the cartridge holder 102 is rotated towards the cartridge loading section 103, the center hole 11 of the optical disc 2 housed in the disc cartridge 1 is engaged by the centering section 91 and the rim 2a of the center hole 11 is carried in position by the cartridge loading section 103, as shown in FIG. 21. The optical disc 2 is loaded for rotation in unison with the turntable 90, as the optical disc 2 is centered, with the center of rotation of the turntable 90 being in registration with that of the optical disc 2.

When the cartridge holder 102 is rotated towards the cartridge loading section 103, the disc cartridge 1 is loaded on the loading support member 86, as the fitting protrusion 92 is fitted in the center opening 12 formed in the main cartridge body unit 5 and as the mounting reference surface 82 is carried by the cartridge support part 93, as shown in FIG. 21. Hence, the disc cartridge 1 is loaded on the cartridge loading section 103 as the disc cartridge is positioned in two crossing directions, that is, in the planar direction and in the height-wise direction.

With the disc recording and/or reproducing apparatus of the present invention, employing the disc cartridge 1 according to the present invention, the apparatus itself may be reduced in size because it is no longer necessary to provide positioning means, such as positioning pins, for supporting the outer rim of the disc cartridge for setting the loading position of the disc cartridge 1.

Figure 22:
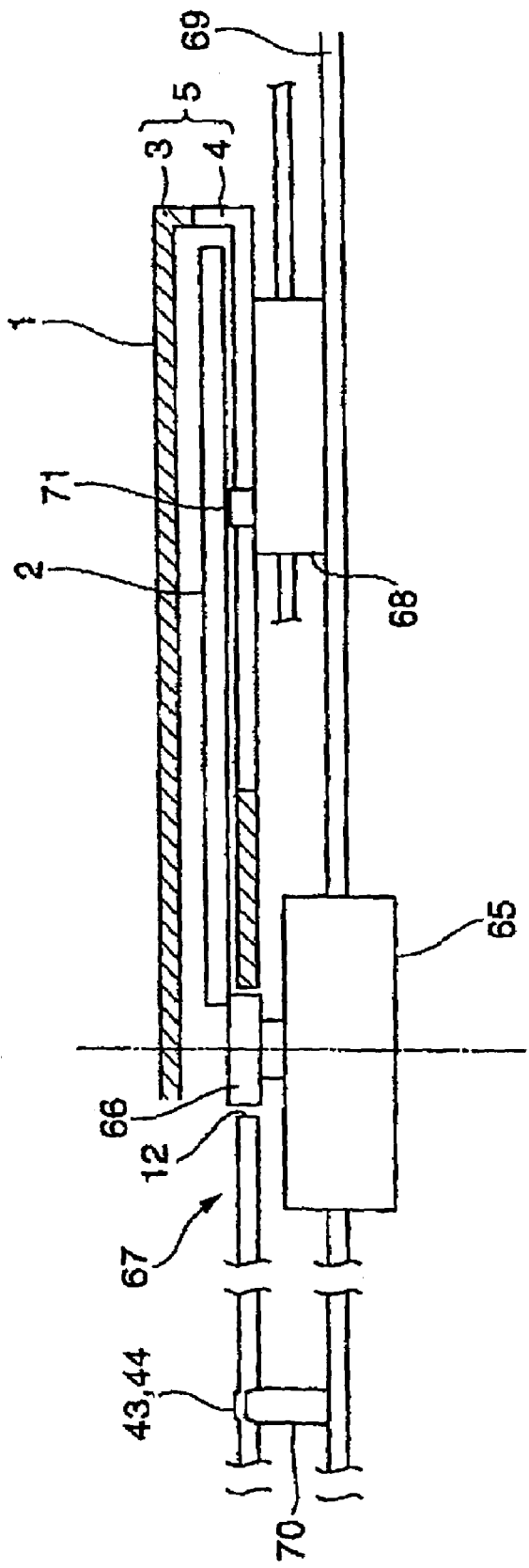
FIG. 22 is a cross-sectional side view showing the state in which the disc cartridge has been loaded on the cartridge loading section to reproduce the optical disc.

The state of loading the disc cartridge of the present invention on the disc drive device 50 will now be explained in further detail. Referring to FIG. 22, the disc cartridge 1 is loaded on a cartridge loading section 67, provided in the main body unit 51, with the lower surface of the disc cartridge, provided with the center opening 12 thereof, into which is intruded a turntable 66 of a disc rotation driving unit 65 provided to the disc drive device 50, as a loading surface.

Meanwhile, the cartridge loading section 67 is formed on a base 69 on which there are provided the disc rotation driving unit 65 and an optical pickup 68 for reproducing data recorded on the optical disc 2. The cartridge loading section 67 is provided with a positioning pin 70 for positioning the disc cartridge 1 in the planar direction and with a positioning lug, not shown, for positioning the disc cartridge in the height-wise direction. The disc cartridge 1 is loaded on the cartridge loading section 67, as it is positioned in the planar direction and in the height-wise direction, by having the positioning pin 70 engaged in first and second positioning holes 43, 44 and by having its lower surface carried by the height-wise positioning lug.

In the disc cartridge 1 of the present invention, there is formed the cut-out 25 in a region of the upstanding peripheral wall section 4a of the lower cartridge half 4 facing the aperture for the head part 13, as previously explained.

The slide guide 18 of the upper cartridge half 3, carrying the shutter unit 15, is configured so that, when the optical disc 2 in the disc cartridge 1 loaded in position along the height-wise direction on the cartridge loading section 67 is loaded in position on the turntable 66, at least a portion of the slide guide facing the aperture for the head part 13 is of a height H1 not protruded from the lower surface 2a of the optical disc 2 facing the lower cartridge half 4, as shown in FIG. 7.

Figure 23:
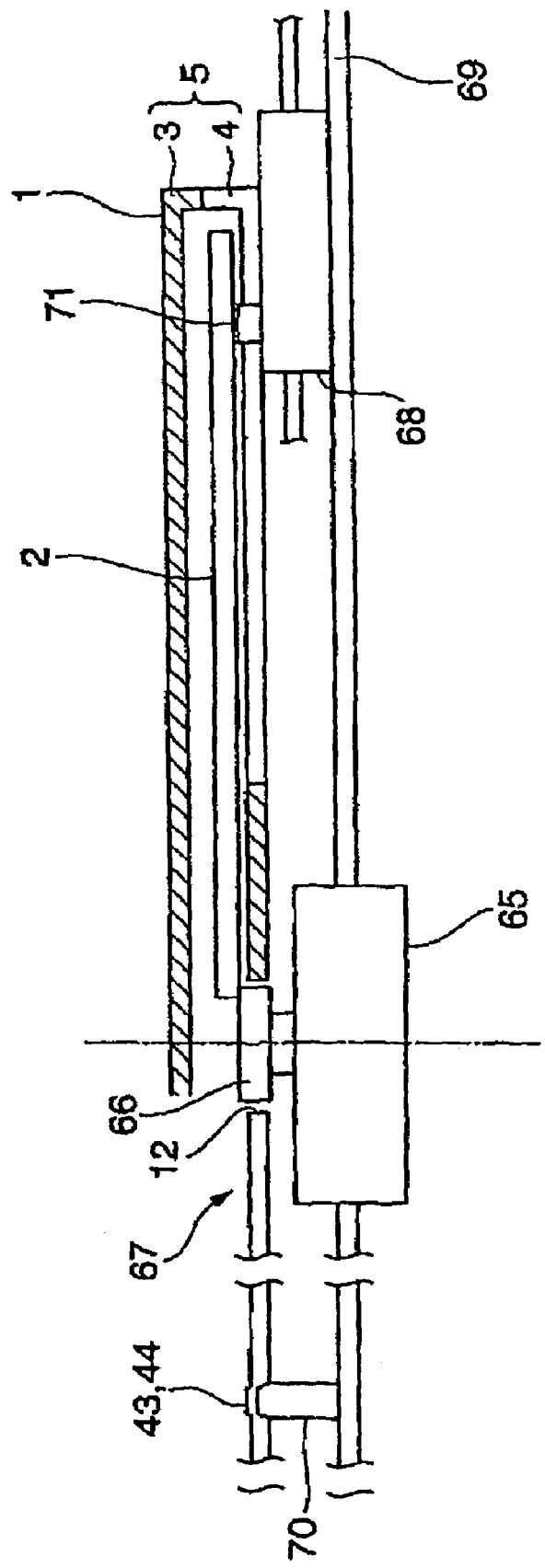
FIG. 23 is a cross-sectional side view showing the state in which an optical pickup has been moved to the outer peripheral side of the optical disc housed in the disc cartridge loaded on the cartridge loading section.

With the above-described disc cartridge 1, the optical pickup 68, as a head part for reading information signals, recorded on the optical disc 2, may be positioned in its entirety within the main cartridge body unit 5, when the shutter unit 15 is moved and the aperture for the head part 13 is opened, as shown in FIG. 22. Moreover, when the optical pickup 68 has been moved to a position of scanning the outer rim of the optical disc 2, an objective lens 71 for condensing a light beam, scanning a signal recording region of the optical disc 2, may be located within the main cartridge body unit 5, while the remaining portions of an optical block 72 may be positioned outside the main cartridge body unit 5, as shown in FIG. 23.

The result is that the disc cartridge 1 according to the present invention may be positioned along a path across the inner and outer parts of the main cartridge body unit 5, and hence the signal recording area may be formed as far as the outer edge of the optical disc 2, such as to increase the recording capacity of the optical disc 2. Moreover, since the optical pickup 68 may be approached to the optical disc 2, the numerical aperture (NA) of the objective lens 71 may be enlarged to reduce the beam spot of the light beam condensed on the signal recording area of the optical disc 2, thereby improving the recording density of the information signals recorded on the optical disc 2. Furthermore, since the recording density may be improved with increase in the recording capacity, the optical disc 2 in need of a preset recording capacity may be reduced in diameter. In addition, since the optical pickup 68 may be positioned along a path across the inner and outer sides of the main cartridge body unit 5 to scan the optical disc 2, the main cartridge body unit 5 may be reduced in size, and hence the disc recording and/or reproducing apparatus, employing this disc cartridge 1 may be reduced in size.

The above-described disc cartridge 1 has housed therein the replay-only optical disc 2. The present invention may, however, be applied to a disc cartridge having housed therein a recording and/or reproducing optical disc, capable of re-recording information signals, or other types of the disc-shaped recording mediums, with equally favorable results.

The present invention is not limited to the above embodiment explained with reference to the drawings, but various changes, substitutions or equivalents may be attempted without departing from the scope of the invention as defined in the claims.

INDUSTRIAL UTILIZABILITY

The disc cartridge according to the present invention may be reduced in size and hence may be used as a recording medium for a small-sized mobile recording and/or reproducing apparatus.

What is claimed is:

1. A disc recording and/or reproducing apparatus comprising:
   a disc; and
   a disc cartridge having a main cartridge body unit configured to house said disc therein and provided in at least one surface thereof with a recording and/or reproducing aperture for exposing a part of said disc across inner and outer rims thereof;
   wherein an opening for a driving unit, into which is intruded at least a part of rotational driving means, configured for rotationally driving said disc, is formed in one surface of said main cartridge body unit; the inner peripheral surface of said opening for the driving unit operating as a mounting reference plane in a planar direction for mounting the disc cartridge on a recording and/or reproducing apparatus; the peripheral edge of said opening for the driving unit in said one surface operating as a mounting reference plane in the height-wise direction for mounting the disc cartridge on the recording and/or reproducing apparatus; and
   an annular loading support part configured to position said disc cartridge in the horizontal direction and in the height-wise direction, said loading support part having a ring-shaped center fitting protrusion at an inner periphery fitted in said opening for a driving unit of said disc cartridge, the annular loading support part spaced apart from and surrounding the driving unit,
   wherein the peripheral edge of the opening is configured to abut against an outer peripheral edge of the annular loading support part.

2. The disc cartridge according to claim 1 wherein a lateral side of said main cartridge body unit is formed as a substantially semicircular arcuate section having the center of said disc housed in said main cartridge body unit as center.

3. The disc cartridge according to claim 2 wherein said arcuate section is formed on a side of insertion of said main cartridge body unit into the recording and/or reproducing apparatus.

4. The disc cartridge according to claim 3, wherein said recording and/or reproducing aperture is formed facing a lateral side of said main cartridge body unit other than the lateral side formed as said arcuate section.

5. The disc cartridge according to claim 1 further comprising:
   a shutter unit configured to open/close said recording and/or reproducing aperture; and
   a slide guide formed on said main cartridge body unit for movably carrying said shutter unit;
   said slide guide being provided such that, when said inner peripheral surface is set on said recording and/or reproducing apparatus, said mounting reference plane in said height-wise direction is protruded from said slide guide towards said rotational driving means.

6. A disc recording and/or reproducing apparatus comprising:
   a cartridge holder on which is loaded a disc cartridge including a main cartridge body unit, said main cartridge body unit rotatably housing an optical disc, said main cartridge body unit being provided in at least one surface thereof with a recording and/or reproducing aperture for exposing a part of said optical disc across inner and outer rims, an opening being formed in one surface of said main cartridge body unit into which is intruded at least a part of rotational driving means configured for rotationally driving said disc, the inner peripheral surface of said opening operating as a mounting reference plane in a planar direction for mounting the disc cartridge on a recording and/or reproducing apparatus, the peripheral edge of said opening in said one surface operating as a mounting reference plane in the height-wise direction;
   an annular loading support part configured to position said disc cartridge in the horizontal direction and in the height-wise direction; and
   said annular loading support part having a ring-shaped center fitting protrusion at an inner periphery, fitted in said opening for a driving unit of said disc cartridge, said annular loading support part spaced apart from and surrounding the driving unit and having a tapered surface at an outer periphery carrying the peripheral edge of said opening for the driving unit of said disc cartridge,
   wherein the peripheral edge of the opening is configured to abut against an outer peripheral edge of the annular loading support part.

7. The disc recording and/or reproducing apparatus according to claim 6 wherein said loading support part is formed for surrounding the outer rim of rotation driving means for rotationally driving said disc.

* * * * *